United States Patent
Jiang et al.

(10) Patent No.: US 12,280,556 B2
(45) Date of Patent: Apr. 22, 2025

(54) ASSEMBLY OF FLEXIBLE OPTICAL WAVEGUIDES AND PHOTONIC CHIPS FOR OPTICAL INTERCONNECTION PACKAGING

(71) Applicant: Arizona Board of Regents on Behalf of the University of Arizona, Tucson, AZ (US)

(72) Inventors: Linan Jiang, Tucson, AZ (US); Stanley K. H. Pau, Tucson, AZ (US); Robert A. Norwood, Tucson, AZ (US); Thomas L. Koch, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 614 days.

(21) Appl. No.: 17/423,893

(22) PCT Filed: Jan. 17, 2020

(86) PCT No.: PCT/US2020/014031
§ 371 (c)(1),
(2) Date: Jul. 18, 2021

(87) PCT Pub. No.: WO2020/150572
PCT Pub. Date: Jul. 23, 2020

(65) Prior Publication Data
US 2022/0105695 A1 Apr. 7, 2022

Related U.S. Application Data

(60) Provisional application No. 62/793,964, filed on Jan. 18, 2019.

(51) Int. Cl.
*B29D 11/00* (2006.01)
*G02B 6/42* (2006.01)

(52) U.S. Cl.
CPC ........ *B29D 11/0075* (2013.01); *G02B 6/4239* (2013.01)

(58) Field of Classification Search
CPC ....... H05K 1/0274; H05K 2201/10121; B29D 11/0075; G02B 6/4239; G02B 6/43;
(Continued)

(56) References Cited

U.S. PATENT DOCUMENTS

| 2006/0210769 A1 | 9/2006 | Swindlehurst et al. |
| 2013/0119242 A1 | 5/2013 | Goddard et al. |

(Continued)

FOREIGN PATENT DOCUMENTS

| WO | 2017/189955 A1 | 11/2017 | |
| WO | WO-2020150572 A1 * | 7/2020 | ......... B29D 11/0075 |

*Primary Examiner* — Sonya M Sengupta
(74) *Attorney, Agent, or Firm* — Kaplan Breyer Schwarz, LLP; Stuart H. Mayer

(57) ABSTRACT

A method of forming an optical interconnect between first and second photonic chips located on an optical printed circuit board (OPCB) includes applying a coupling agent to a bonding surface of a flexible, freestanding polymer waveguide array film having at least one polymer waveguide disposed therein. The waveguide array film is placed onto the first and second photonic chips so that the waveguide array film extends over a gap and/or a step between the first and second photonic chips to thereby form a bonding interface between the bonding surface of the waveguide array film and the first and second photonic chips. The coupling agent is selected such that optical coupling between the first and second photonic chips arises simultaneously with formation of the bonding interface.

36 Claims, 24 Drawing Sheets

(58) Field of Classification Search
CPC .......... G02B 6/138; G02B 6/305; G02B 6/32; G02B 6/3839; G02B 6/4214; G02B 6/4232; G02B 6/4281
See application file for complete search history.

(56) References Cited

U.S. PATENT DOCUMENTS

| | | |
|---|---|---|
| 2015/0078712 A1 | 3/2015 | Brunner et al. |
| 2015/0277161 A1 | 10/2015 | Ptasinski |
| 2017/0329080 A1 | 11/2017 | Sahni et al. |
| 2018/0246286 A1* | 8/2018 | Lohse .................... G02B 6/305 |
| 2018/0335586 A1 | 11/2018 | Jou et al. |
| 2022/0105695 A1* | 4/2022 | Jiang .................. B29D 11/0075 |

* cited by examiner

ASSEMBLY OF FLEXIBLE OPTICAL WAVEGUIDES AND PHOTONIC CHIPS FOR OPTICAL INTERCONNECTION PACKAGING

GOVERNMENT FUNDING

This invention was made with government support under Grant No. FA8650-15-2-5220, awarded by Air Force Material Command. The government has certain rights in the invention.

BACKGROUND

Polymer waveguides (WGs) are promising to serve as optical components for interconnection between photonic chips. The interconnect assembly requires firm physical contact of the polymer WGs with the photonic WGs on the chips. It also demands precision alignment to establish optical couplings with minimum losses.

SUMMARY

In accordance with one aspect of the subject matter described herein, a method is presented of forming an optical interconnect between first and second photonic chips located on an optical printed circuit board (OPCB). In accordance with the method, a coupling agent is applied to a bonding surface of a flexible, freestanding polymer waveguide array film having at least one polymer waveguide disposed therein. The waveguide array film is placed onto the first and second photonic chips so that the waveguide array film extends over a gap and/or a step between the first and second photonic chips to thereby form a bonding interface between the bonding surface of the waveguide array film and the first and second photonic chips. The coupling agent is selected such that optical coupling between the first and second photonic chips arises simultaneously with formation of the bonding interface.

In accordance with another aspect of the subject matter described herein, a bonding system is presented. The bonding system includes a vision system, an illumination system and controlling electronics. A bonding tool has a spatially adjustable shaft adjustable in the x, y and Z-directions. First and second adjustment arms extends from a distal end of the spatially adjustable shaft. The first adjustment arm is fixedly secured to the spatially adjustable shaft. An adjustment stage is movable in the x, y and Z-directions. The adjustment stage is secured to a distal end of the second adjustment arm for providing fine adjustments of the second adjustment arm. First and second holding members are configured to hold portions of a flexible substrate using suction. The first holding member is connected to the distal end of the first adjustment arm and the second holding member is connected to a distal end of the adjustment stage. A bonding stage supports by suction a second substrate onto which the flexible substrate is to be mounted.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

As explained in more detail below, described herein is a method to assemble polymer waveguides with photonic chips and an instrument for performing the assembly process. The method includes surface treatment to promote adhesion and the dispensing of potting material to reduce optical loss in waveguide connection. The instrument enables assembly of a flexible polymer film to two photonic chips simultaneously with alignments to accommodate small offsets and/or steps between the two chips.

Figure 1:
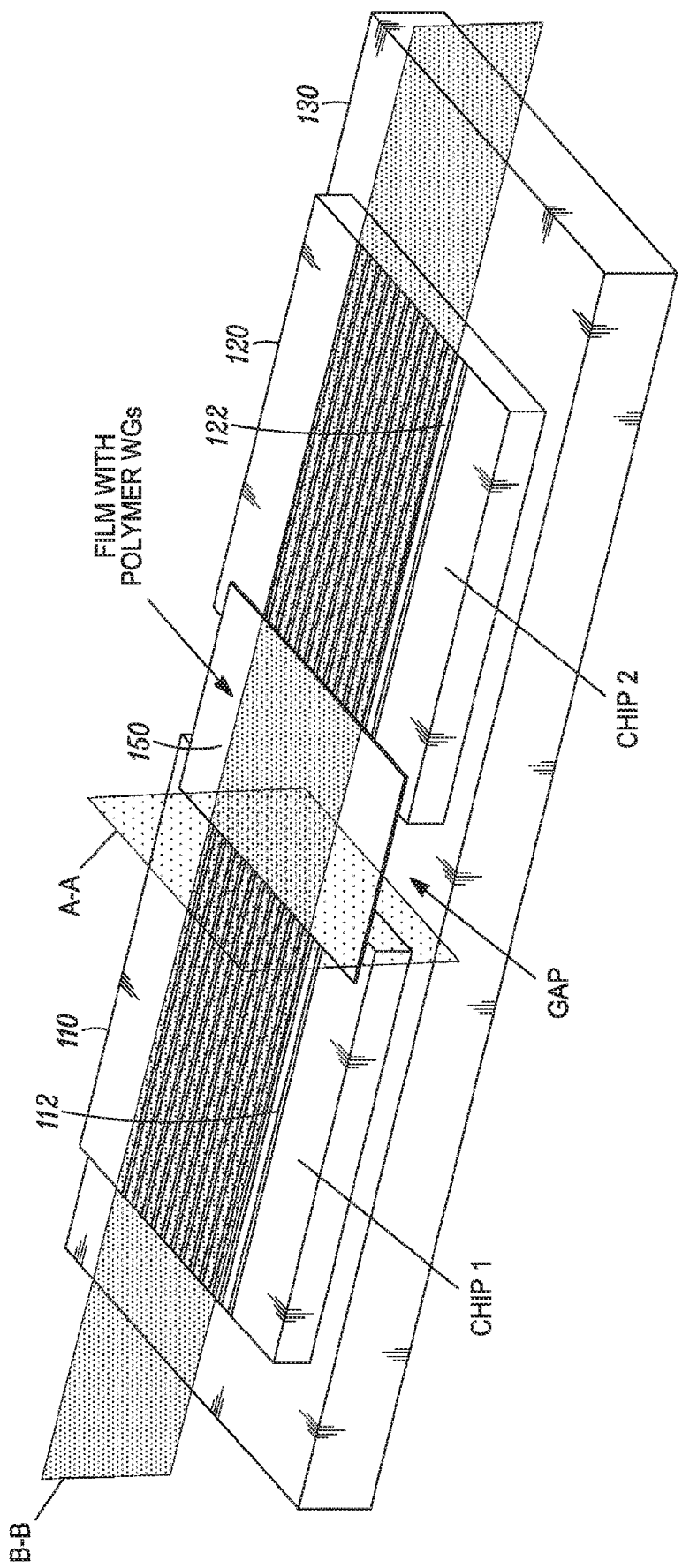
FIG. 1 illustrates a typical configuration of the interconnect assembly, which includes two photonic chips secured to a printed circuit board (PCB) with a gap between the chips.
Figure 2:
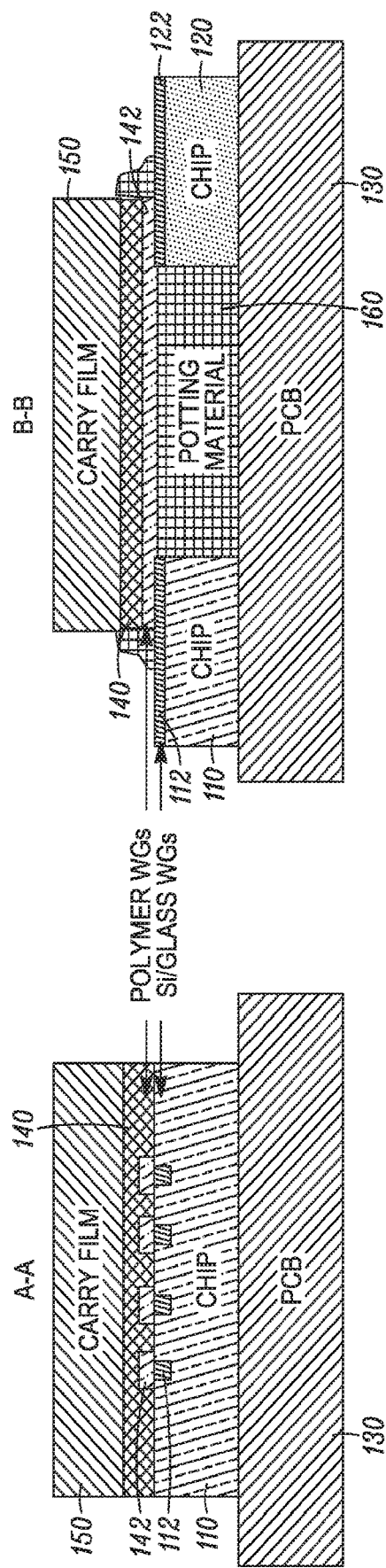
FIG. 2 shows cross-sectional views of the interconnect assembly taken along planes A-A and B-B in FIG. 1.

FIG. 1 illustrates a typical configuration of the interconnect assembly, which includes two photonic chips 110 and 120 secured to a printed circuit board (PCB) 130 with a gap between the chips 110 and 120. A flexible carry-film 150 with polymer waveguides (shown in FIG. 2) is assembled on both photonic chips 110 and 120. FIG. 2 shows cross-sectional views of the interconnect assembly taken along planes A-A and B-B in FIG. 1. FIG. 2 shows the array of planar polymer waveguides 142, consisting of waveguide cores and cladding and defined in a polymer layer 140, which is realized on the flexible carry-film 150.

A typical optical path through each of the interconnect WGs 142 in the flexible-carry film 150 is divided into three segments: (1) segments of the polymer WGs 142 (core and cladding refractive indices, $np_{core}$, $np_{clad}$) coupled with the first set of photonic WGs 112 (core and cladding refractive indices $n1_{core}$, $n1_{clad}$), (2) segments of the polymer WGs 142 suspended between the chips, exposing the waveguide cores to air (refractive index of air $n_{air}$), and (3) segments of the polymer WGs 142 coupled with the $2^{nd}$ set of photonic WGs 122 (core and refractive indices $n2_{core}$, $n2_{clad}$). These transitions induce optical losses. A potting material 160 with an appropriate refractive index may be applied in the gap and surroundings to reduce the losses and serve as cladding layer for the polymer WGs 142. As explained below, the polymer WGs 142 are treated to promote adhesion at the assembly surface exposing the cores where the polymer WGs couple to their pairing WGs on the photonic chips 110 and 120.

Surface Functionalization and Film Assembly to Chips

Robust assemblies of polymer WGs with chips rely on methods of film attachment with sufficient bonding strength. Optical epoxy or glues may be applied at the bonding interfaces; however, the film must be very thin and uniform. The presence of multiple components and uneven surfaces on a PCB deems it challenging, or even impractical, to obtain a thin and uniform layer by conventional spin coating or pressing techniques. The thickness of the adhesive layer needs to be sufficiently thin such that its existence does not alter light coupling between the photonic WGs and the polymer WGs on the film. In addition, the refractive index of the adhesive material must be matched specifically for coupling a particular pair of photonic chips and polymer WGs. Typically, most of the epoxy adhesives require curing by either UV or elevated temperatures, adding complexity to the assembly process.

An interconnect assembly method has been developed utilizing surface functionalization. One particular implementation of the method will be described below, followed by a description of certain variants thereto.

Polymer WGs are first realized on a flexible carry-film with designated waveguides configurations and dimensions. An example of such a carry-film with polymer WGs was presented above in connection with FIGS. 1 and 2. The bonding surface of the film was activated briefly in oxygen plasma, and subsequently immersed in a solution of 5% 3-Aminopropyltriethoxysilane (APTES) in water. After incubation for 4 to 24 hours at a temperature range of 80° C. to room temperature, respectively, a monolayer was established on the polymer WGs surfaces. The chip bonding surfaces were modified by a brief oxygen plasma treatment prior to attachment of the film. Excess liquid on the film was removed by nitrogen flow. While still moist, the film was brought into contact with the chips. The residual moisture in the film allows adhesion of the film onto the chip surfaces without bubble formation; this is attributed to liquid surface tension. The assembly was left at room temperature overnight or longer for the bonding process.

Figure 3A:
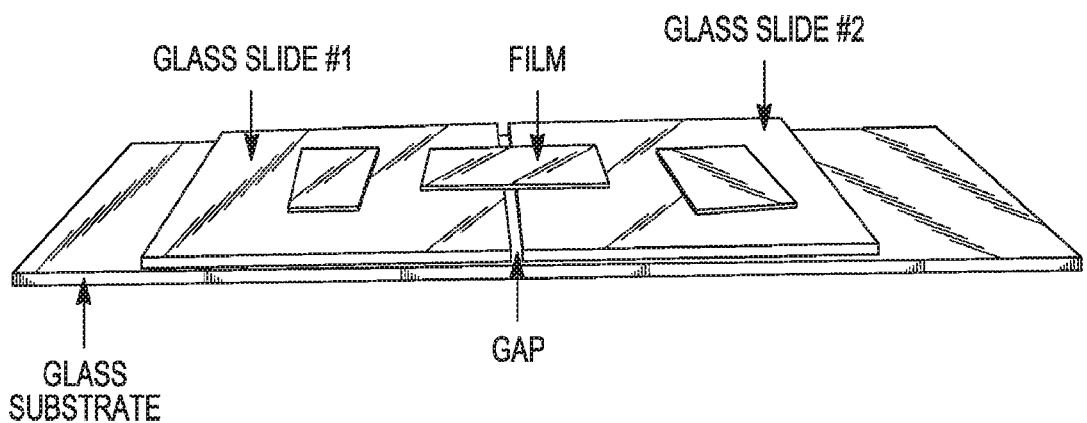
FIGS. 3(a) and 3(b) respectively show an image and a schematic diagram of an assembly that includes a polymer film overlying two glass chips.
Figure 3B:
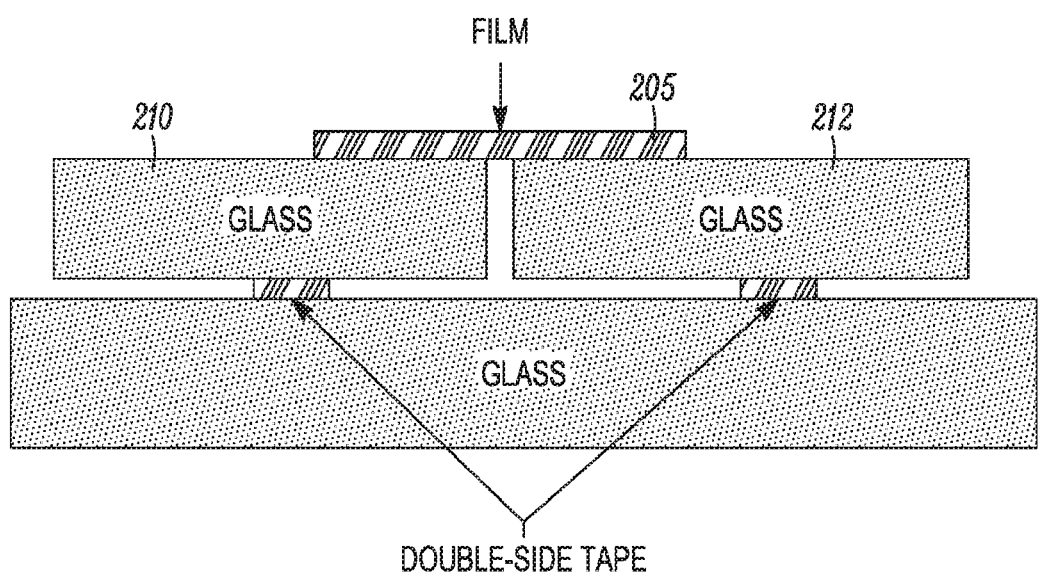

FIG. 3(a) shows an image of a polymer WG film bonded on two chips following the above described process. FIG. 3(b) is a schematic diagram of the polymer WG film 205 on two glass slides 210 and 212, which are 1 mm-thick with a 1 mm-gap between them. The carry-film 205 is 50 μm-thick Tefzel film, where a 2 μm-layer of optical polymer WIR (ChemOptics, Korean) is coated on the film bonding surface, simulating polymer waveguides.

Figure 4C:
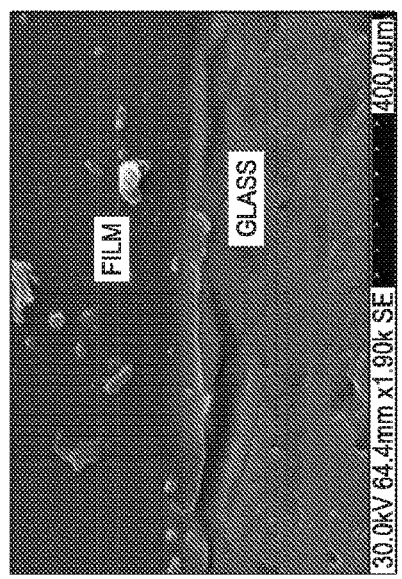
FIGS. 4(a), 4(b) and 4(c) are images showing the bonding interface between the contact surfaces of the glass chips and the polymer film of FIG. 3.
Figure 4B:
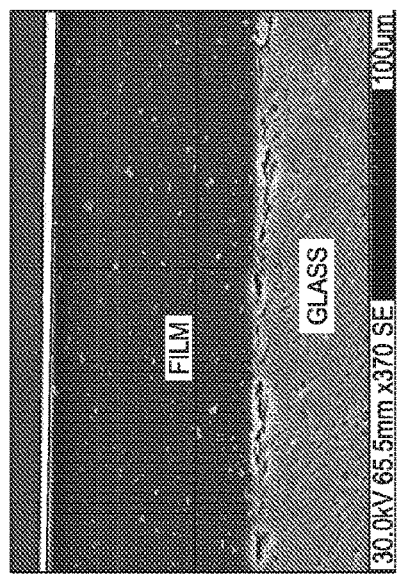
Figure 4A:
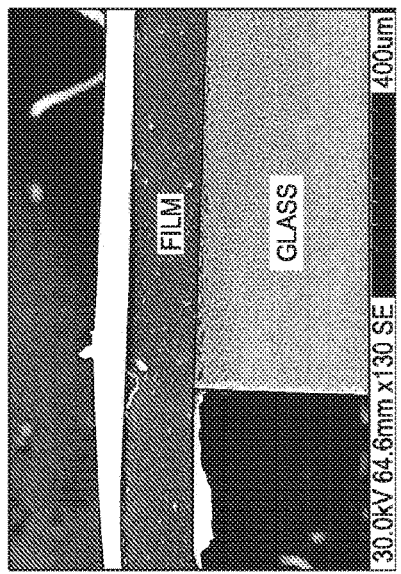

To examine the bonding quality, the assembled sample was diced using a standard wafer dicing machine to expose the cross-section of the bonding interface. SEM microscopy was performed to evaluate the bonding interfaces. The images presented in FIGS. 4(a)-4(c) reveal that a continuous and tight bonding interface is realized between the contact surfaces of glass and the film. In addition, the thickness of the APTES layer at the bonding interface is not distinguishable, demonstrating that the APTES adhesion is likely a mono layer and has negligible thickness.

Figure 5A:
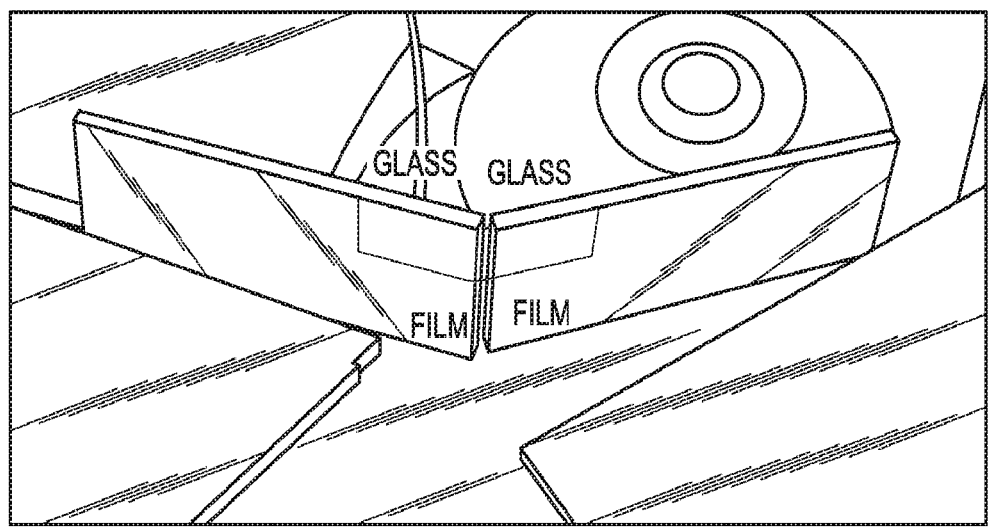
FIGS. 5(a) and 5(b) are images illustrating the bonding strength of the assembly shown in FIG. 3
Figure 5B:
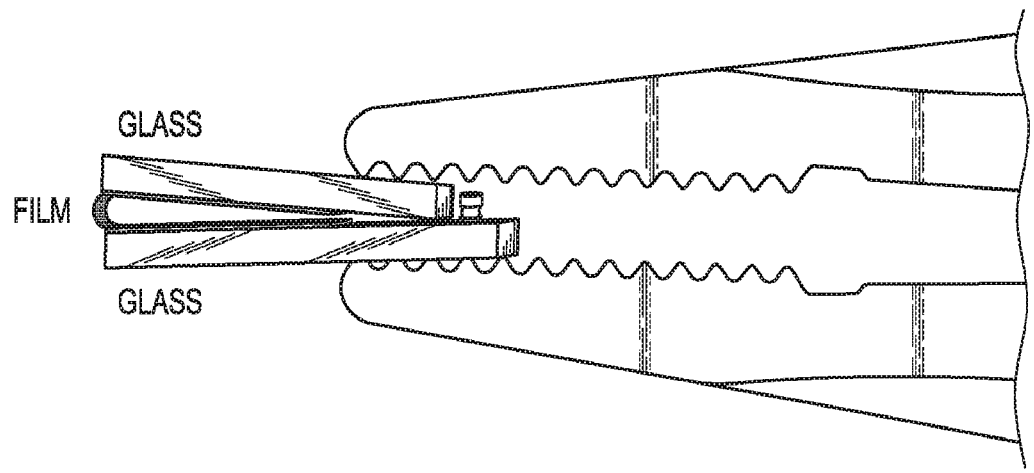

To characterize the bonding strength, the sample was subjected to bending and peeling tests. As shown in FIG. 5(a), the bonding is sufficient to sustain bending with the bottom surfaces of the glass slides facing each other, where the bending angle is limited due to the small space between the gap. The sample, clamped by a tweezer at the glass slides, can be bent almost 360 degrees with the assembly surfaces facing each other without delamination, as shown in FIG. 5(b). A peeling test was performed using a simple right-angle peeling setup. The two pieces of glass slides at each end of the film were set at horizontal and vertical, respectively, with the film on the inside surface of the 90° bend. The horizontal slide was fixed in place while the vertical slide was clamped and subjected to a vertical pulling by weight. The weight was gradually increased until the holding of the clamp on the vertical glass slipped off without observation of delamination. The maximum weight tested without signs of delamination was about 6N; accordingly, the pressure is estimated to be about 150 KPa for a bonding surface of 40 $mm^2$.

Figure 6A:
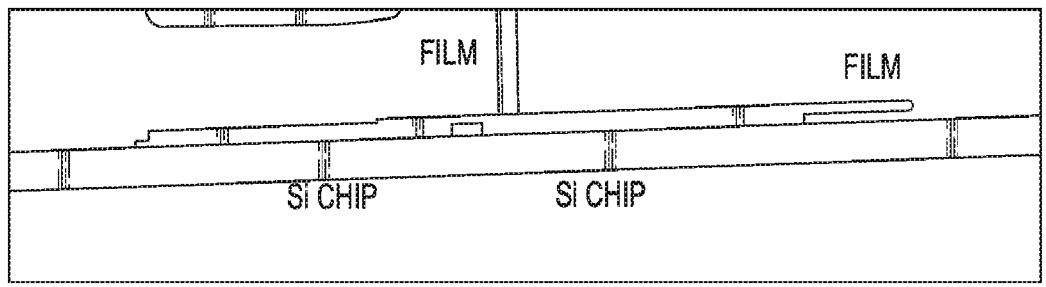
FIGS. 6(a) and 6(b) respectively show an image and a schematic diagram of an assembly of two polymer films on Si chips.
Figure 6B:
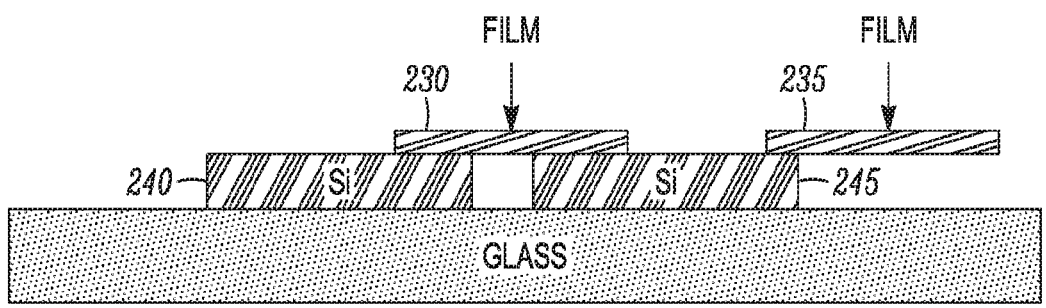
Figure 7A:
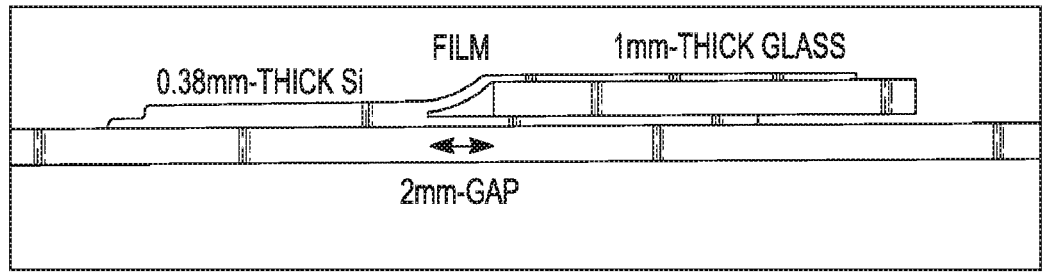
FIGS. 7(a) and 7(b) respectively show an image and a schematic diagram of an assembly of a polymer film on a glass chip and an Si chip with a step between them.
Figure 7B:
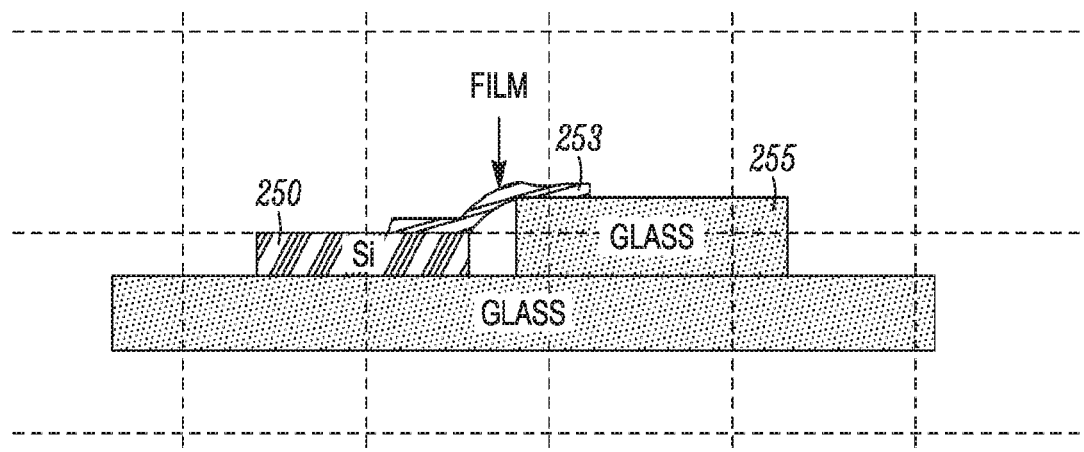

Similar to assembly of the polymer WG film onto a glass substrate, polymer waveguides can be assembled with WGs on Si substrate. FIGS. 6(a) and 6(b) show an image and schematic diagram, respectively, of an assembly of films 230 and 235 on silicon chips 240 and 245 over a gap between the two chips, as well as at the edge of the one chip 245. Furthermore, FIGS. 7(a) and 7(b), which show an image and schematic diagram, respectively, of a polymer film 253 over two chips 250 and 255 that differ in height. The flexible polymer film 253 was assembled with a 0.38 mm-thick silicon chip 250 and a 1 mm-thick glass chip 255 and can accommodate the step between the two chips. The results show that the interconnect assembly can be realized with a reasonable bonding strength regardless of the chip material type, i.e. silicon and glass. The flexible nature of the polymer film offers an inherent advantage in interconnect assemblies with accommodations.

In some implementations the assembly method described herein can be integrated in a conventional flip-chip bonding process using a commercial bonder, such as the Finetech Lambda Bonder (Finetech USA), for example. With the capability of alignment, interconnect polymer waveguides can be assembled to the waveguides on photonic chips with approximately half-micron precision.

The assembly method described above may be modified when using a bonder. In particular, two chips with the same thickness were first fixed on a board with a desired gap in a range of 400 μm-2000 μm between the chips, and alignment between the waveguide features on both chips was achieved. A flexible film with polymer waveguides was picked up by the placer arm on its position probe with vacuum. Upon alignment of the polymer waveguides on the film with the waveguides on the chips, a small drop of 5% APTES in water was dispensed using a fine-tip pipette onto each chip at the bonding location to wet the surface. Excess liquid was promptly removed using the pipette so only a very thin layer of liquid remained on the chip surfaces. The film was then brought into contact with the chip surfaces with a gentle pressing. After five minutes in contact the film was released from the position probe, realizing assembly of the film and the two chips with alignment. The sample was left at room temperature overnight or for a longer time to further establish the bonds. Plasma treatment of the bonding surfaces prior to bonding is desirable but not required. When the chip surfaces are prepared at a level of cleanliness that meets integrated circuit (IC) processing standard, assembly with reasonable bonding strength can be obtained.

The assembly method can be expanded to applications using various polymer materials and chip surfaces with or without modifications and alterations. A preferred process can be obtained for a particular packaging task by identifying the properties of the bonding surfaces and the architecture arrangement on the board between the photonic chips. A suitable combination of functional silane, solvent, and other operating conditions, such as temperature and processing and curing times, can be determined for a particular assembly. While the example presented above employed APTES as a coupling agent, other silane-based coupled agent may be employed such as: 3 aminopropyltrimethoxysilane (APTMS), 3-aminopropyldimethylethoxysilane (APDMES), N-(6-aminohexyl)aminomethyltriethoxysilane (AHAMTES), bis[3-(trimethoxysilyl)propyl]amine (bis-amino silane), and propyldimethylmethoxysilane (PDMMS), etc. Moreover, coupling agents may be selected from various classes such as organotitanate coupling agents, zirconate coupling agents, zircoaluminate coupling agents, alkyl phosphate esters and phosphoric acid compounds.

In general, the coupling agent film should be sufficiently thin so that the refractive index of the coupling agent does not substantially impact the optical coupling efficiency of the light propagating in the polymer waveguide. In some cases the maximum thickness of the coupling agent film should satisfy this criterion for operating wavelengths between 400 nm and 12 microns. In other cases the layer thickness should be less than $\lambda/n$, where $\lambda$ is the wavelength of light to be coupled between the first and second photonic chips and n is the effective refractive index of the polymer waveguide. In one illustrative example, the layer thickness of the coupling agent film should be less than 50 nm, while in another example the layer thickness should be less than 20 nm.

In summary, the interconnect assembly method described herein using surface functionalization is reproducible and reliable. It offers various applications in optical interconnects with a wide range of polymer waveguides. It eliminates the need to seek a specific adhesive with an appropriate refractive index suitable for assembly of a particular group of polymer waveguides with photonic chips. It also minimizes the uncertainty in residual layer thickness at the waveguide coupling interface. The process can operate at room temperature without using coatings and without baking and UV curing, with no involvement of harsh chemical reagents. The bonding is irreversible with a reasonable bonding strength.

In some embodiments the coupling agent may be applied to the bonding surfaces of the two photonic chips instead of the bonding surface of the polymer WG film. In general, the selected coupling agent, its layer thickness and the other parameters discussed above are equally applicable to these embodiments. Surface treatment (e.g., oxygen plasma treatment) of the bonding surfaces may or may not be necessary. For instance, for some chips oxygen plasma treatment may be needed to improve the surface wettability. In other cases, such as for chips that include electrostatic-sensitive elements, for instance, oxygen plasma treatment should be avoided.

Accommodation for Offsets and Steps in Interconnection Assemblies Using Flexible Polymer Waveguide Film Precision optical alignment of interconnect polymer waveguides and on-chip waveguides is necessary to reduce coupling losses in the packaging of photonic integrated circuits. A typical high-throughput pick and place tool provides a placement accuracy of about ±10 μm (one sigma or standard deviation). However, for single-mode interconnect assemblies, an alignment tolerance better than ±2 μm in offset is generally required. If the interconnect waveguides were made on a rigid substrate, single mode waveguide assembly that needs to overcome ±10 μm offset due to chip misalignment becomes a daunting task. The flexibility of polymer film waveguides offers a unique capability of accommodating this alignment requirement.

Figure 8:
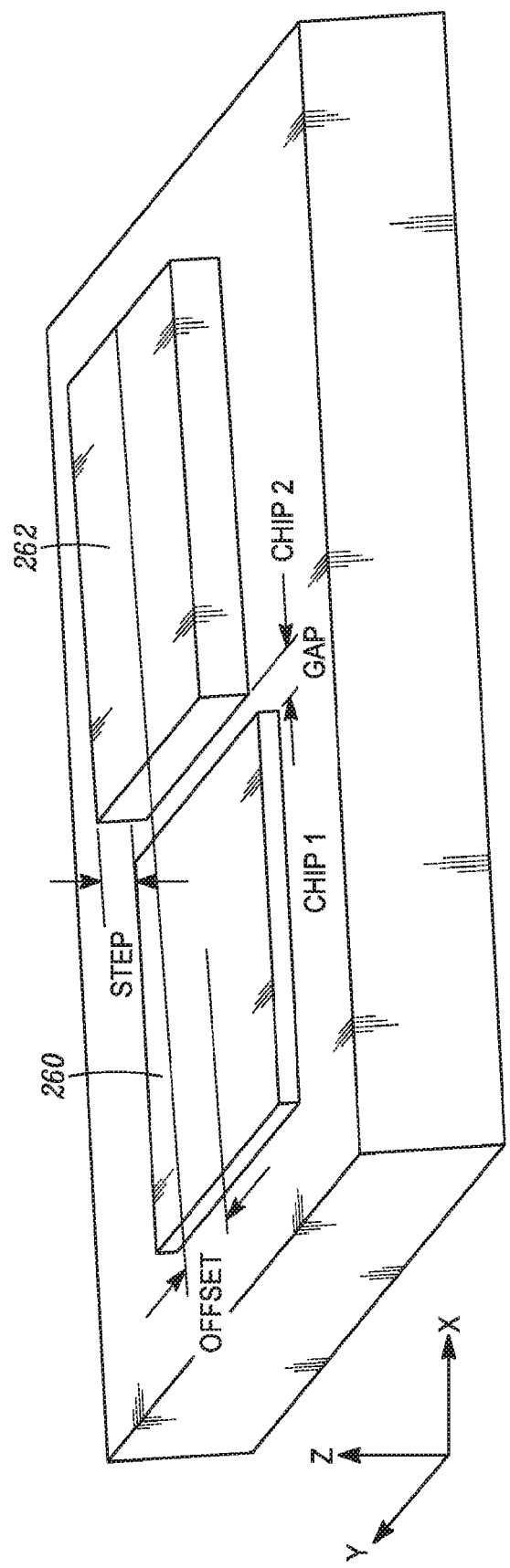
FIG. 8 is a schematic diagram of two chips with a gap, step and an offset between them.

Simulations have been performed to investigate the offset accommodation of a flexible interconnect film assembled onto two rigid chips. The film is modeled as a linear-elastic solid element; deflections in the film described in the model are small such that no optical loss is introduced. FIG. 8 illustrates the layout of the two chips 260 and 262 in the model. The two chips 260 and 262 are set apart with a gap in the X-direction. The waveguides on the two chips 260 and 262 have an offset in the Y-direction due to imperfect alignment. They also have a step in Z-direction due to their difference in thickness. The ability to accommodate offsets was first studied with a film suspended between the two chips 260 and 262 over the gap.

Figure 9A:
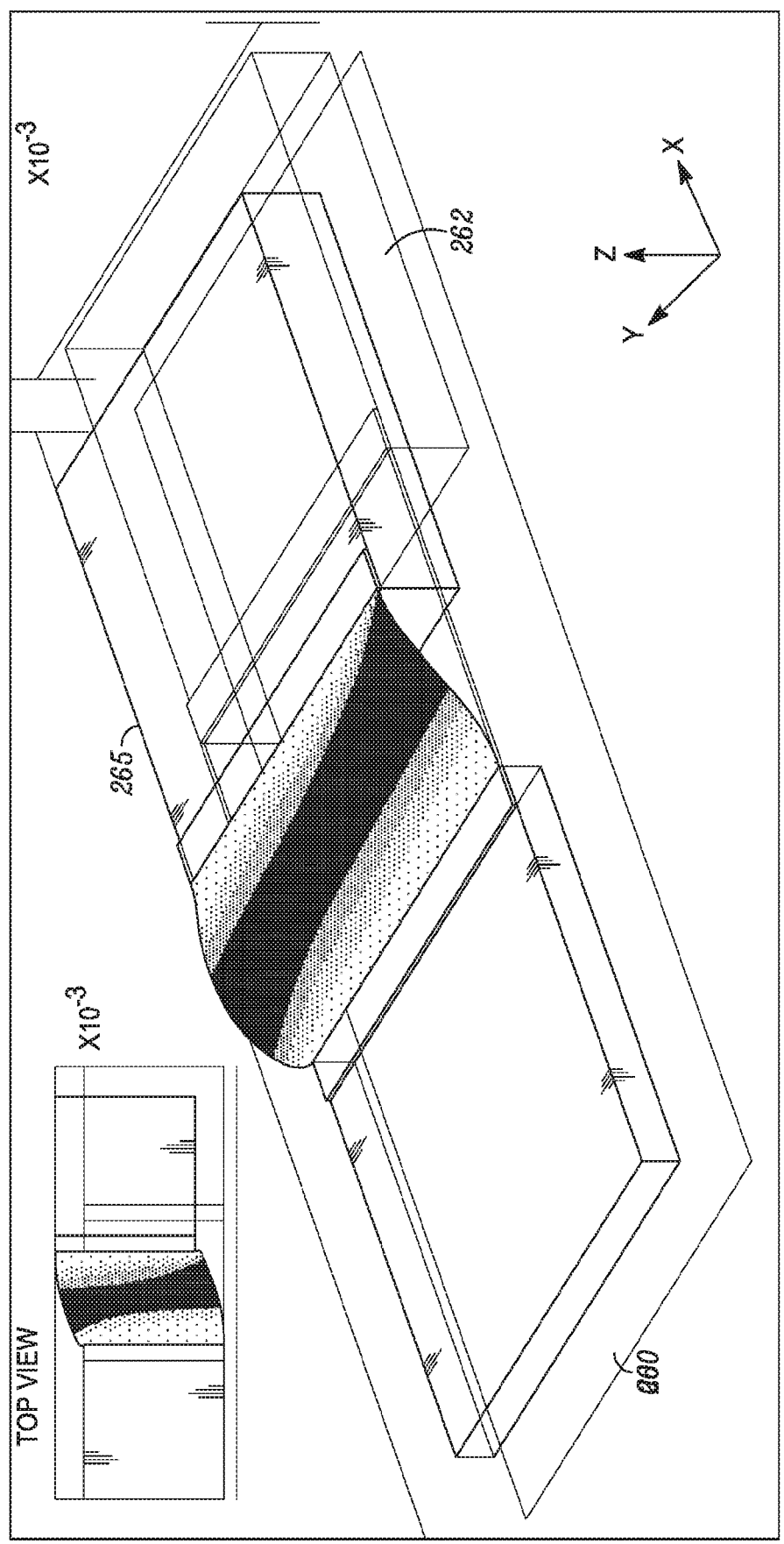
FIG. 9(a) is a schematic diagram of an interconnect assembly of a polymer film on two chips with an offset in the Y-direction.
Figure 9B:
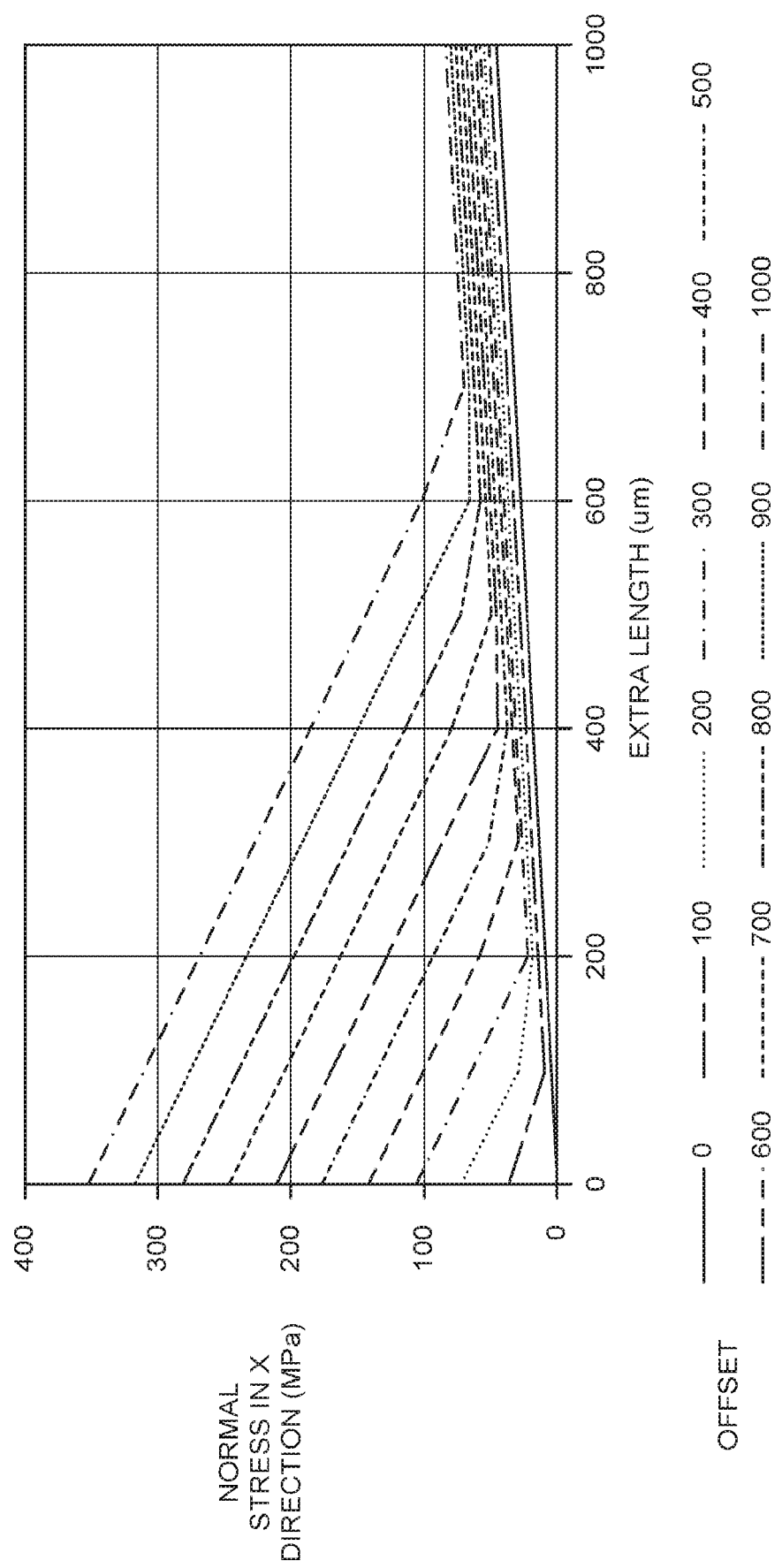
FIGS. 9(b) and 9(c) are graphs illustrating the maximum X-direction tensile stress in the polymer film for various offsets and extra lengths of the polymer film.
Figure 9C:
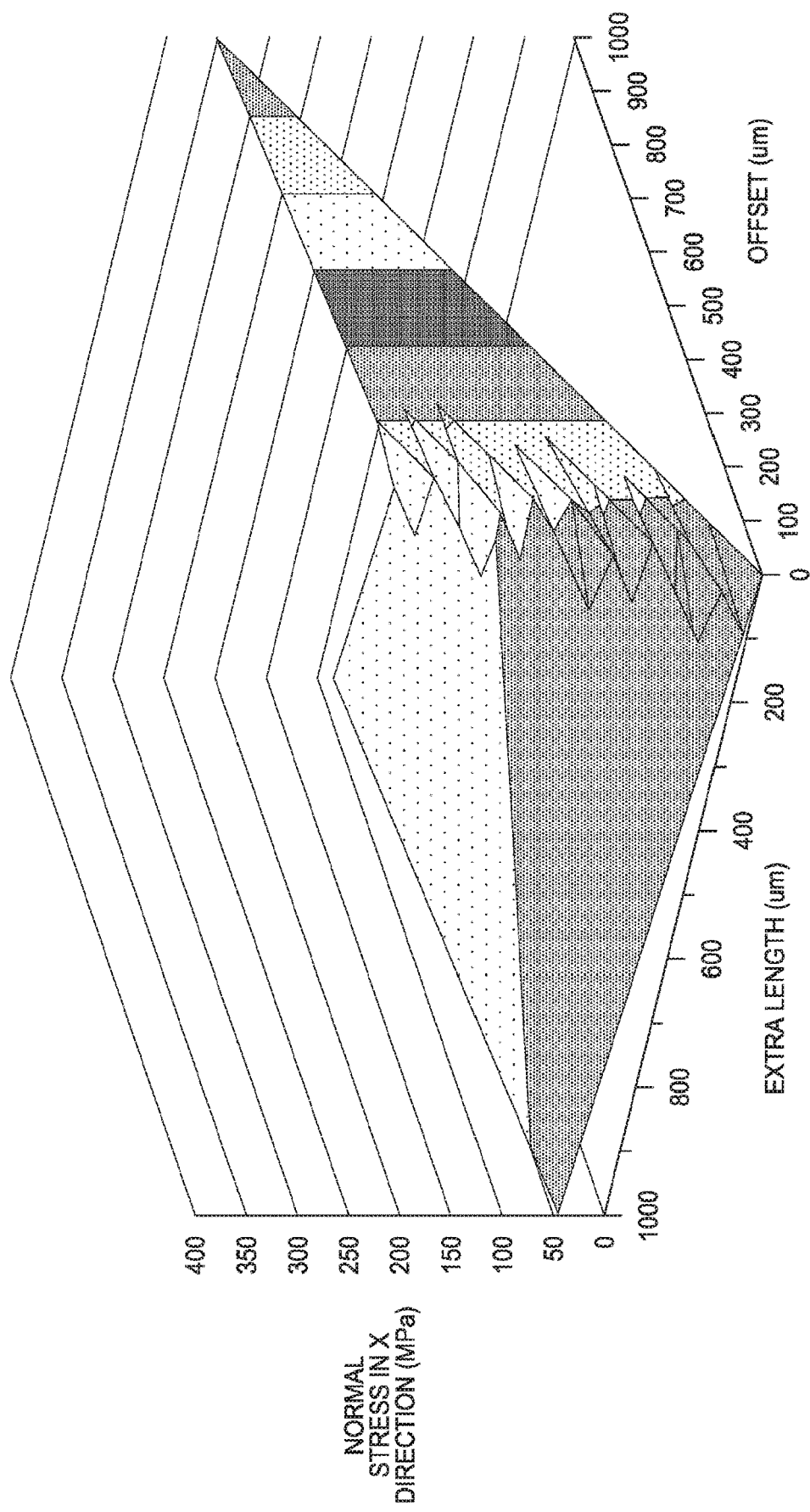

In one example, a Tefzel® film (manufactured by Dupont™) is used with dimensions of 50 μm in thickness and a 5 mm in width in the Y-direction. The gap between the two chips is 4 mm. The film is allowed to slightly bend so as to have a small deflection in the Z-direction. FIG. 9(a) illustrates the amount of Z-deflection of the film 265 using a grey scale map, where black to white indicates low to high Z-deflection. The bent film 265 above the gap has a length longer than the distance of the gap between the two chips 260 and 262, resulting in an extra length of the film 265 in comparison with the gap size. The model evaluates mechanical stresses in the film for different combinations of extra length and offset. Among all the combinations and stresses, the results reveal that, for a given offset while varying extra length, X-direction tensile stress in the film exhibits a strong non-monotonic trend, as shown in the graphs of FIGS. 9(b) and 9(c). This suggests that, to accommodate a given offset, the X-direction tensile stress can be minimized when the film is provided with a particular value of extra length over the gap.

Figure 10A:
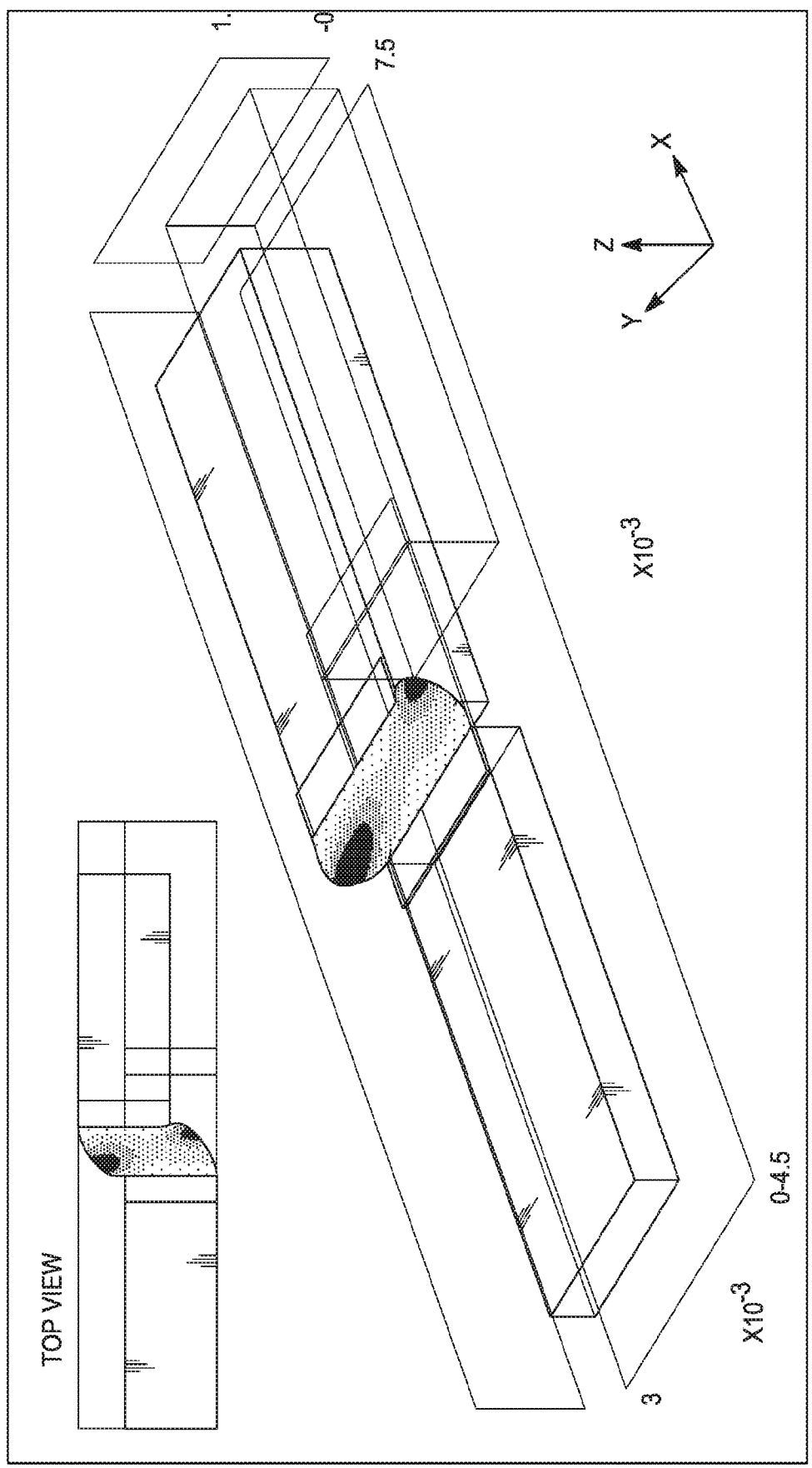
FIG. 10(a) is a schematic diagram of another interconnect assembly of a polymer film on two chips with an offset in the Y-direction.
Figure 10B:
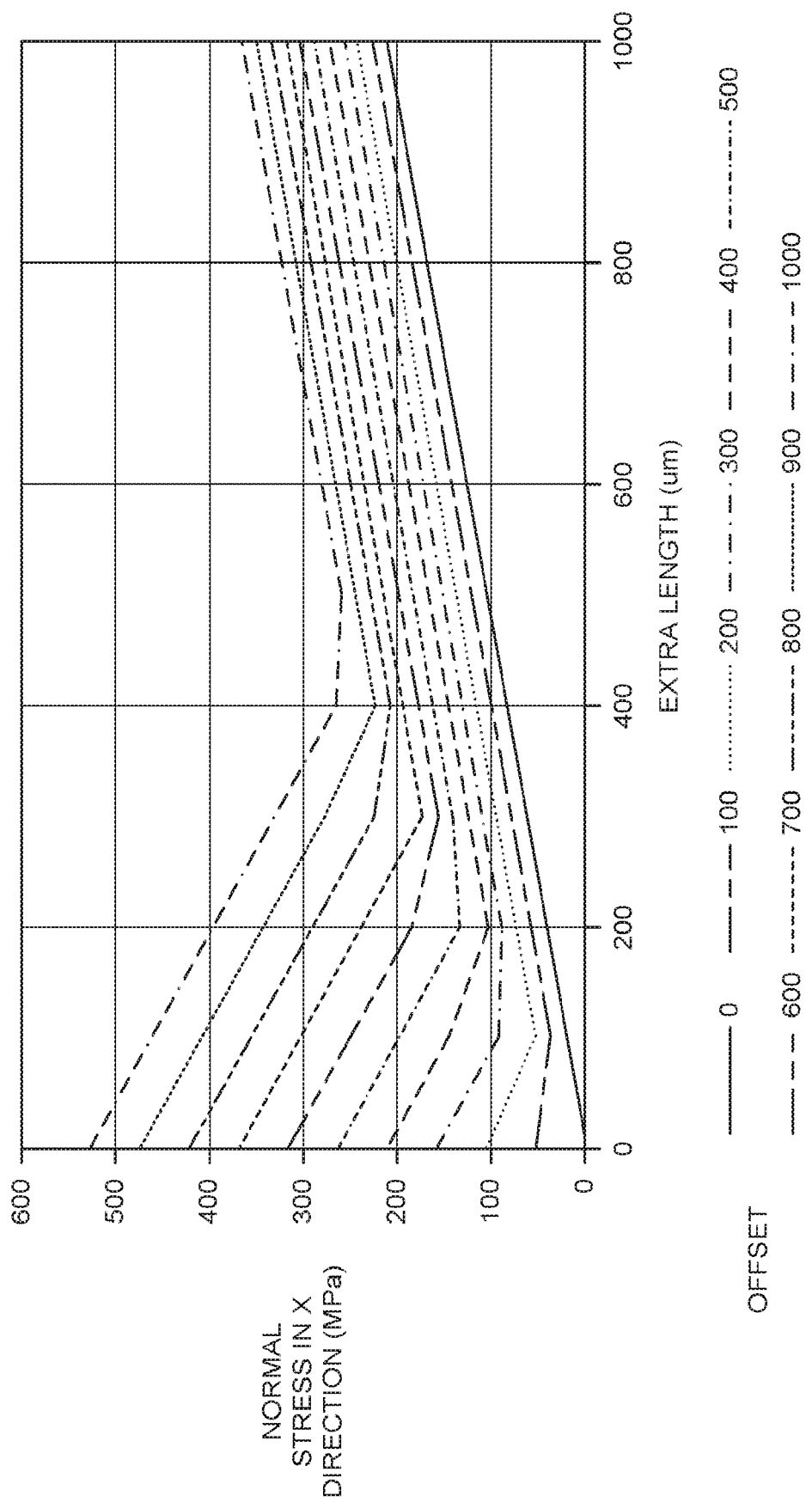
FIGS. 10(b) and 10(c) are graphs illustrating the maximum X-direction tensile stress in the polymer film for various offsets and extra lengths of the polymer film.
Figure 10C:
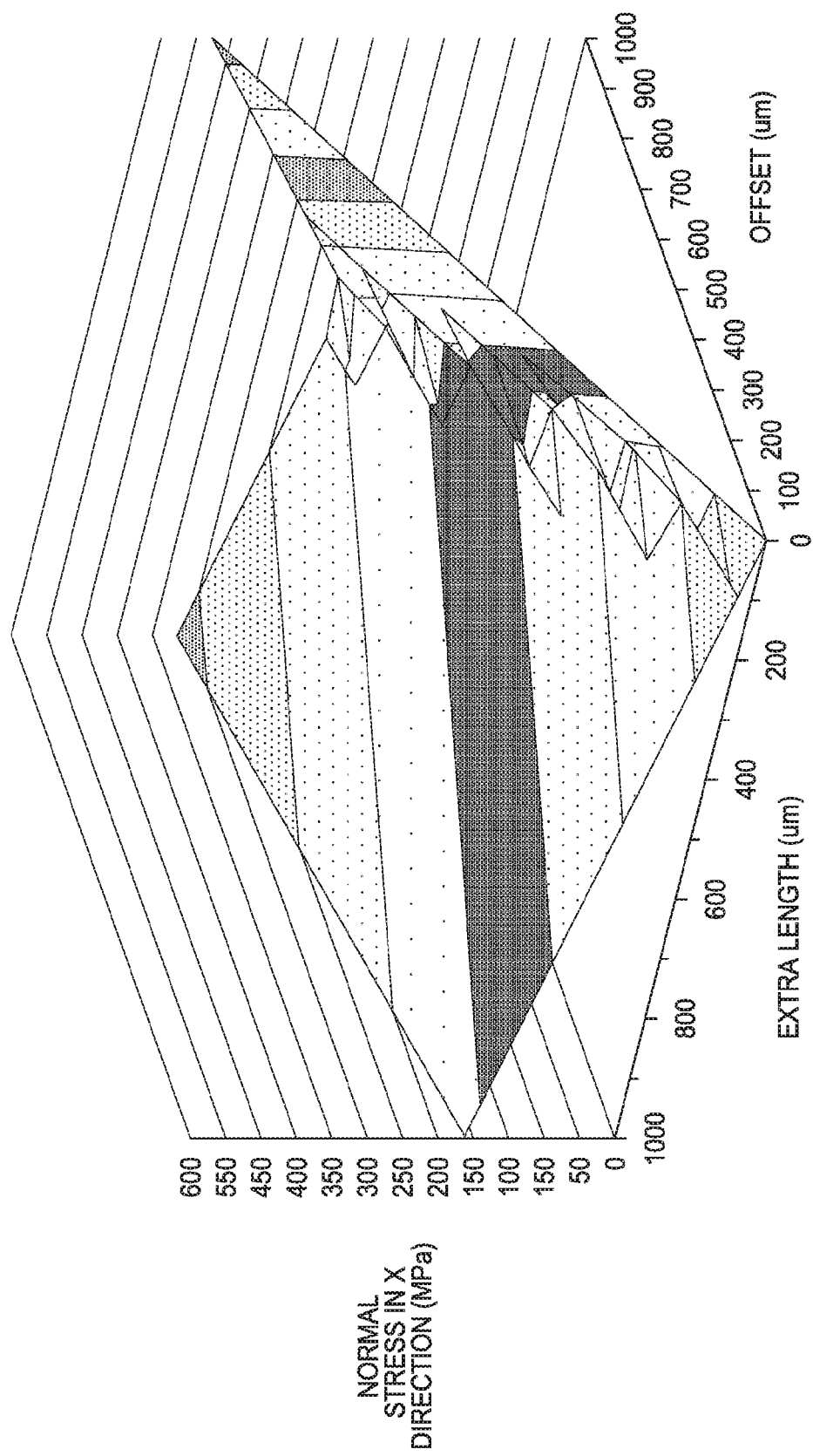
Figure 10D:
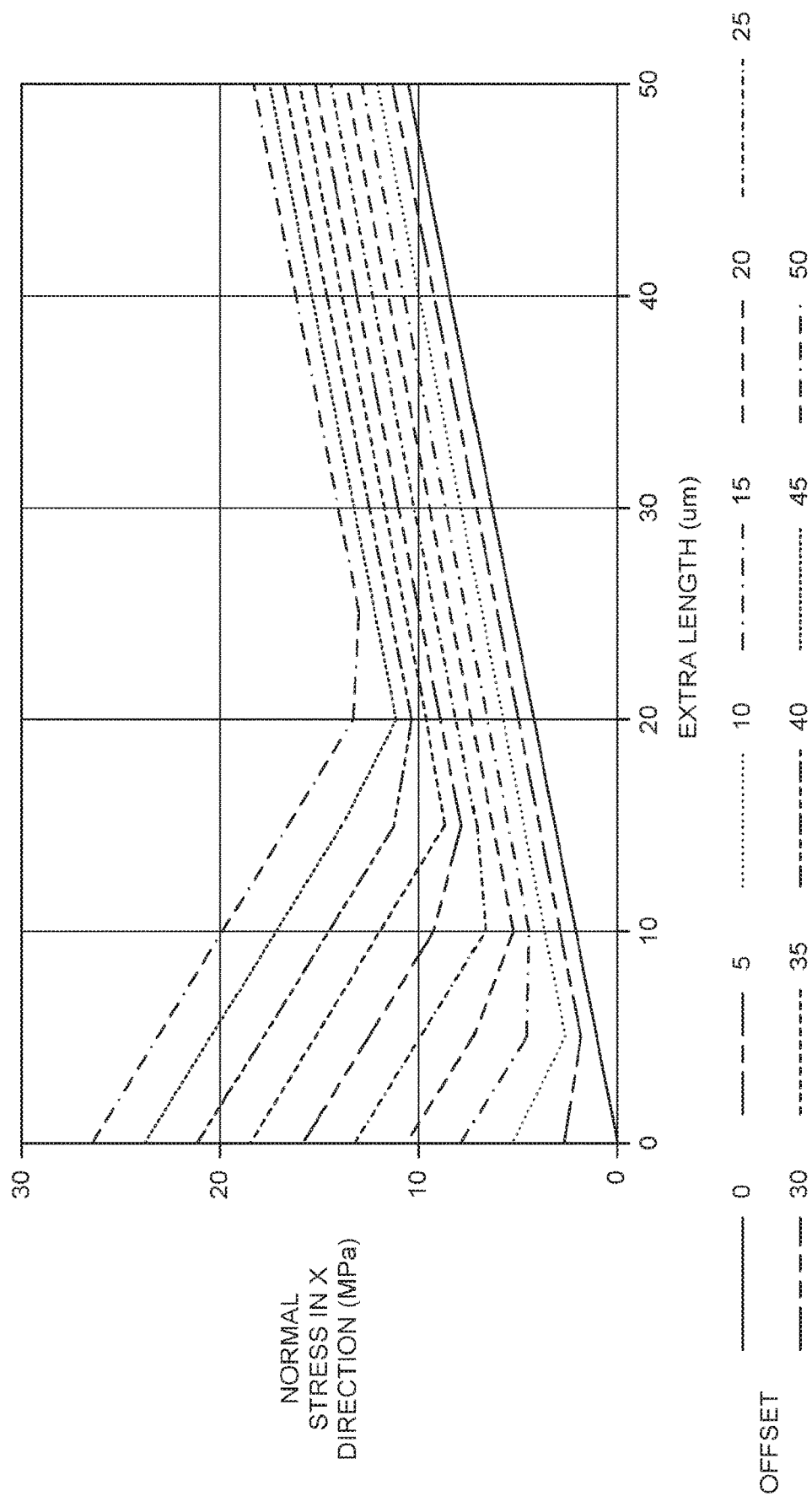
FIGS. 10(d) and 10(e) are graphs illustrating the maximum X-direction tensile stress in the polymer film for various offsets and extra lengths of the polymer film, where the offsets in FIGS. 10(d) and 10(e) are smaller than the offsets in FIGS. 10(b) and 10(c).
Figure 10E:
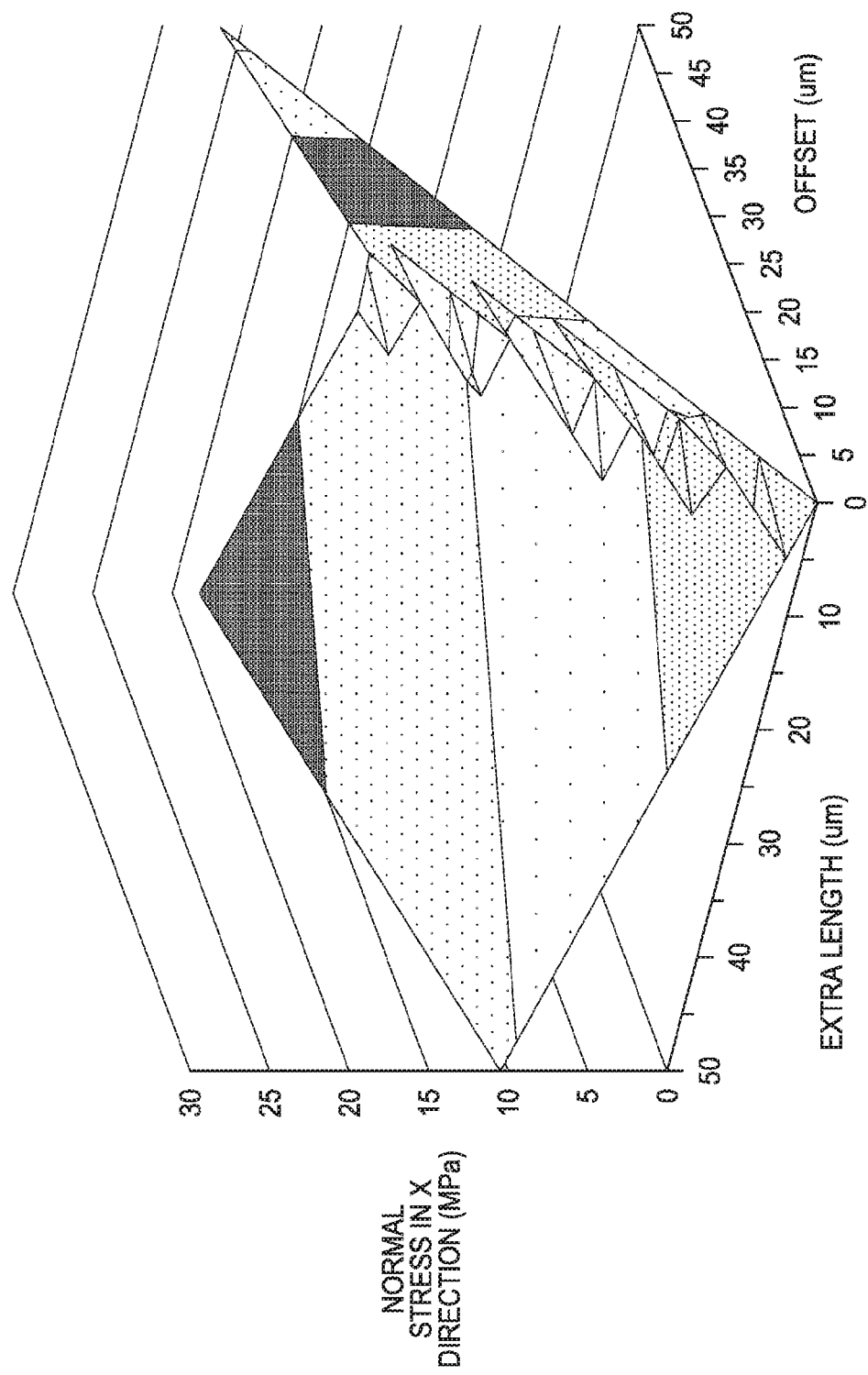

To examine whether similar correlations exist for other cases, simulations were conducted for a 20 μm thick and 2 mm wide Tefzel® film suspended over a 2 mm gap between two chips. FIG. 10(a) shows the Z-deflection grey scale maps, where once again black to white indicates low to high Z-deflection. Similar results in the X-direction tensile stress are obtained, indicating the existence of a stress minimum at specific values of offset and extra lengths, as shown in the graphs of FIGS. 10(b) and 10(c). Larger ranges for offset and extra lengths are examined in the simulation to capture the trend and locations of the minimum. In practical applications, as shown in the graphs of FIGS. 10(d) and 10(e), to accommodate an offset of 25 μm with reduced stress, an extra length of about 10 μm should be provided, resulting in a reduced tensile stress in the X-direction of less than 7 MPa.

Figure 11:
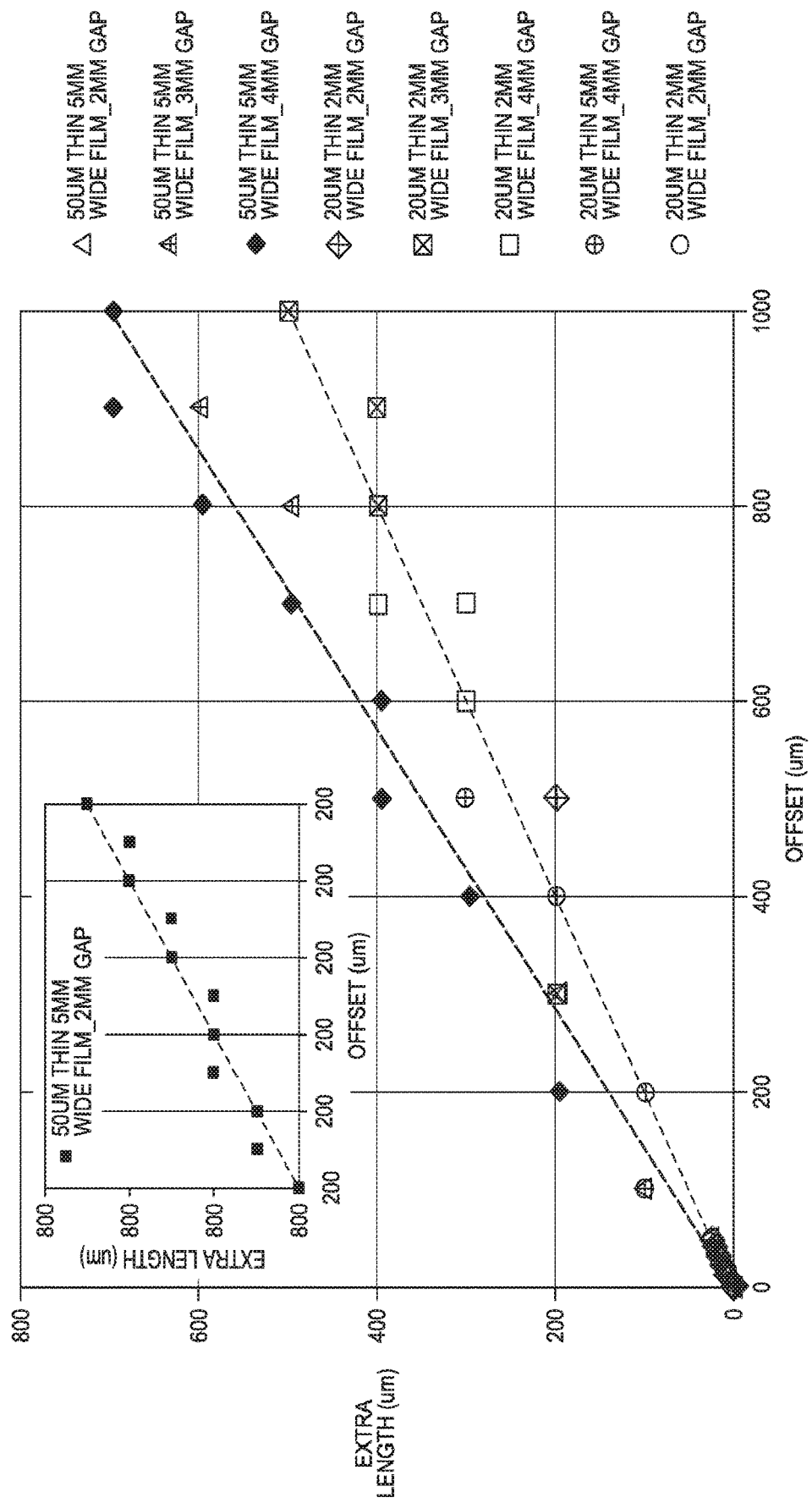
FIG. 11 is a graph illustrating the correlation between offset and extra lengths of the polymer film for reducing stress in the polymer film.

The relationship between extra film length and the offset at minimum film stresses for 20 μm-thick and 50 μm-thick Tefzel® films have been investigated. The effects of film dimensions and assembly parameters, such as gap size, on the relationship are examined and summarized in the graphs of FIG. 11. The value of the extra length varies linearly with offset for the films of both thicknesses. In addition, the results suggest that the film thickness is a dominant parameter defining the relationship for a gap range of 2 mm-4 mm. This implies that, for an interconnect assembly with a known offset, the extra length of the film can be estimated based on a linear relationship using the film thickness and its mechanical properties. In the final assembly, a film longer than the gap size may be used to accommodate an offset at reduced stress. As an example, to assemble an interconnect waveguide film over two chips with a 2 mm-gap and a 25 μm-offset, waveguides of about 2.010 mm in length are desirable to accommodate the offset at reduced stresses, as shown in the inset of FIG. 11.

Figure 12:
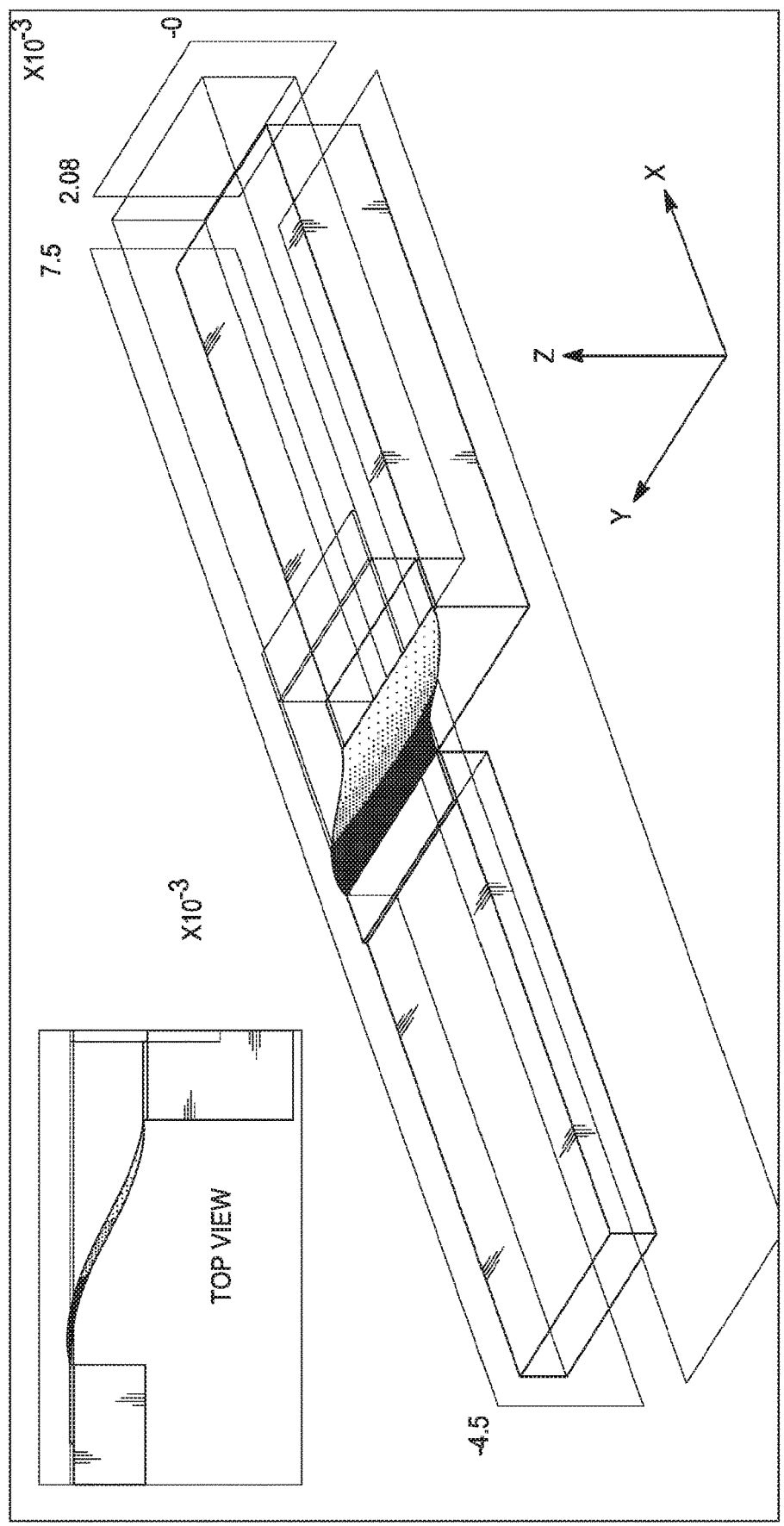
FIG. 12 is a schematic diagram of an interconnect assembly of a polymer film on two chips with a step in the Z-direction.
Figure 13A:
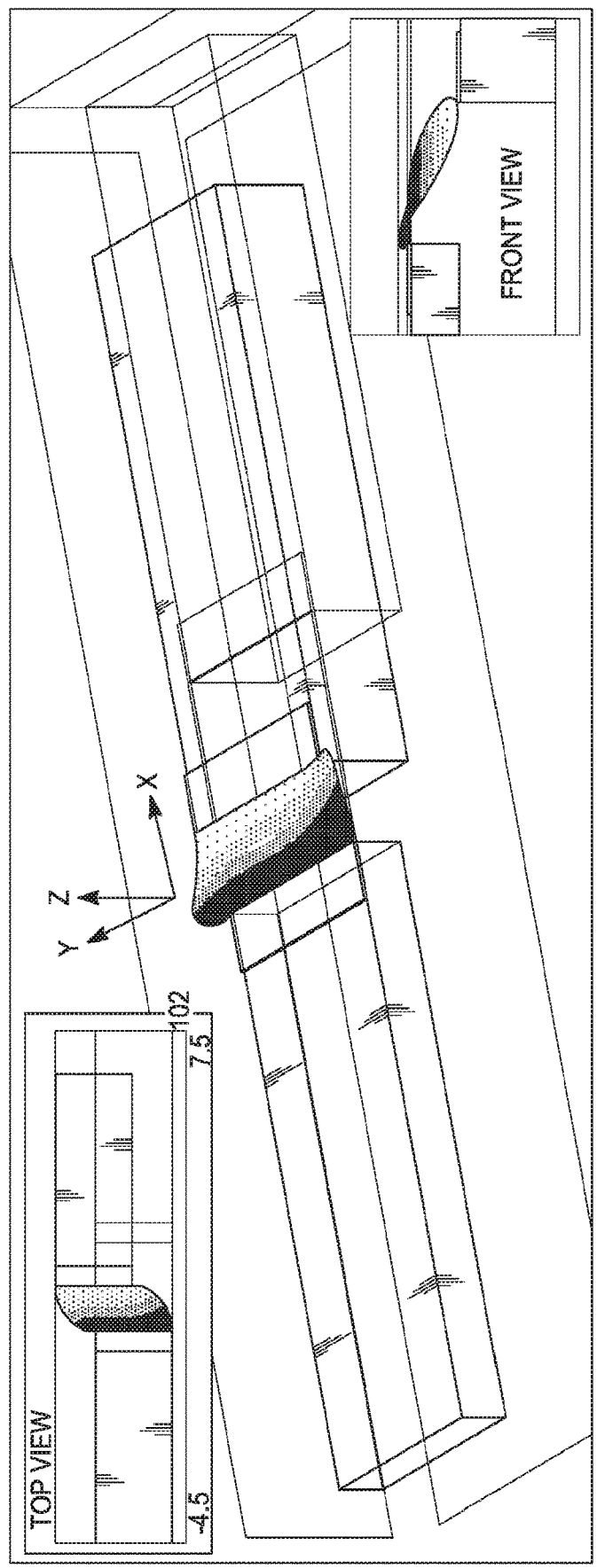
FIG. 13(a) is a schematic diagram of an interconnect assembly of a polymer film on two chips with a gap in the X-direction, an offset in the Y-direction and a step in the Z-direction.
Figure 13B:
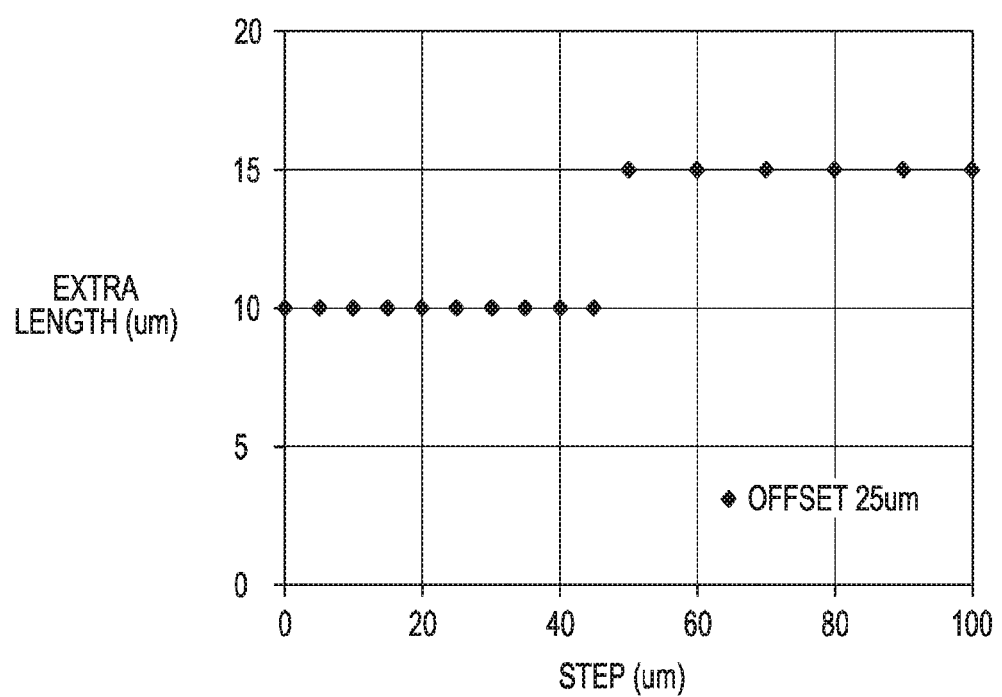
FIG. 13(b) is a graph showing the dependence of the extra length of the polymer film on the step for a given offset.

A flexible film can be assembled onto two chips with a step in the Z-direction. The step could be due to the difference in the chip thickness if both chips are placed on the same board, and/or due to the packaging arrangement which ensures that their assembly surfaces are on the same plane. An extra length for the film can also accommodate a small step in the Z-direction, as illustrated in the Z-deflection grey scale maps shown in FIG. 12. In a more complex interconnect assembly with both a small offset and a small gap between the two chips, as illustrated in the Z-deflection grey scale maps in FIG. 13(a), a flexible polymer waveguide film with predetermined extra length can accommodate both the offset and the gap with reduced stress. The effect of the step on the extra length for a given offset was investigated. For an offset of 25 μm-offset, the same film length about 2.010 mm can accommodate the additional step up to 50 μm. However, to accommodate a 25 μm-offset and a step in the range of 50-100 μm, waveguides about 2.015 mm are preferred for this assembly, as shown in the graph of FIG. 13(b). The inherent mechanical compliance of flexible polymer films permits this accommodation caused by a finite offset and step.

Assembly of Flexible Polymer Waveguides to Chips with an Offset and a Step Utilizing a Dual-Finger Position Probe A typical flip chip bonder has the capability of placing and bonding two chips (e.g., Chip A and Chip B) with an alignment accuracy of half a micron. In general, Chip A is first fixed on the bonding stage by vacuum. The placer arm with a vacuum probe picks up Chip B. Optical alignment between the chips is established by adjusting the stage and the relative chip position. Chip B is brought into contact with Chip A to bond the two chips together.

Existing flip chip bonders permit the following tasks: (1) bonding of two chips with alignment, (2) placement of two chips with desired alignments or offsets in the X and Y-directions on the stage, and (3) bonding of a rigid chip onto two chips on the stage without offset in Y interconnection. However, existing tools lack the capability of establishing functional interconnections for two chips that, besides having a gap in the X-direction, have an offset in the Y-direction and/or a step in the Z-direction.

Figure 14A:
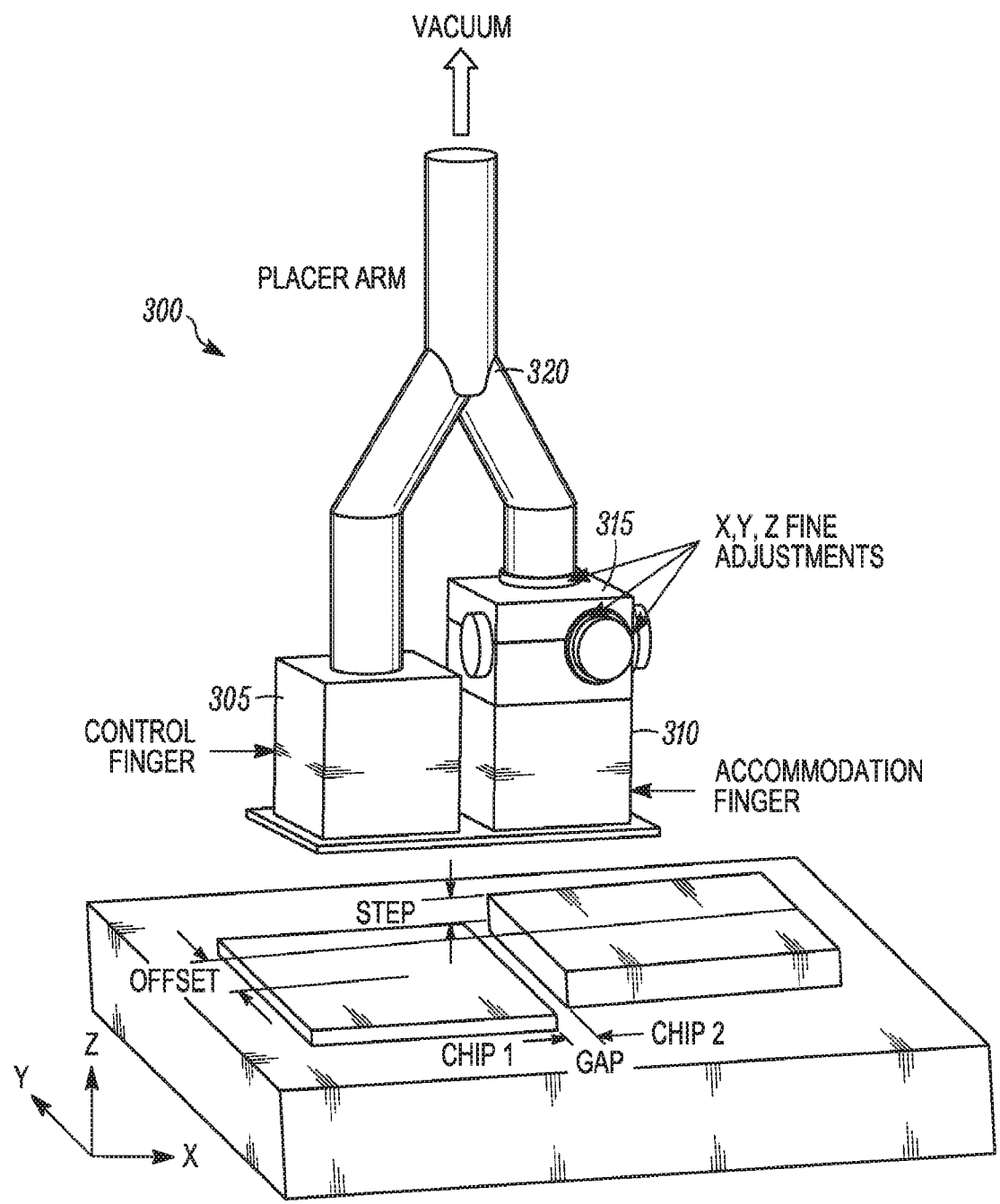
FIGS. 14(a) and 14(b) are schematic diagram of examples of a dual-finger position probe of a flip-chip bonder that may be used to assemble the interconnect assembly shown herein.

To address this limitation, a dual-finger position probe is described herein which can enable such assemblies using flexible films accommodating small offsets and steps. One example of the dual-finger probe is presented in FIG. 14(a). The dual-finger probe 300 includes a control finger 305 and an accommodation finger 310. The control finger 305 may be the same as the typical fixed-position probe on a conventional bonder, whose positions in the X, Y, and Z-directions are fixed at the placer arm 320. The accommodation finger 310, however, is equipped locally with translational stages 315, enabling adjustments of its relative X, Y, and Z positions in reference to those of the control probe. In some embodiments adjustments in the X, Y and Z-directions of up to ±100 μm are desirable.

Figure 14B:
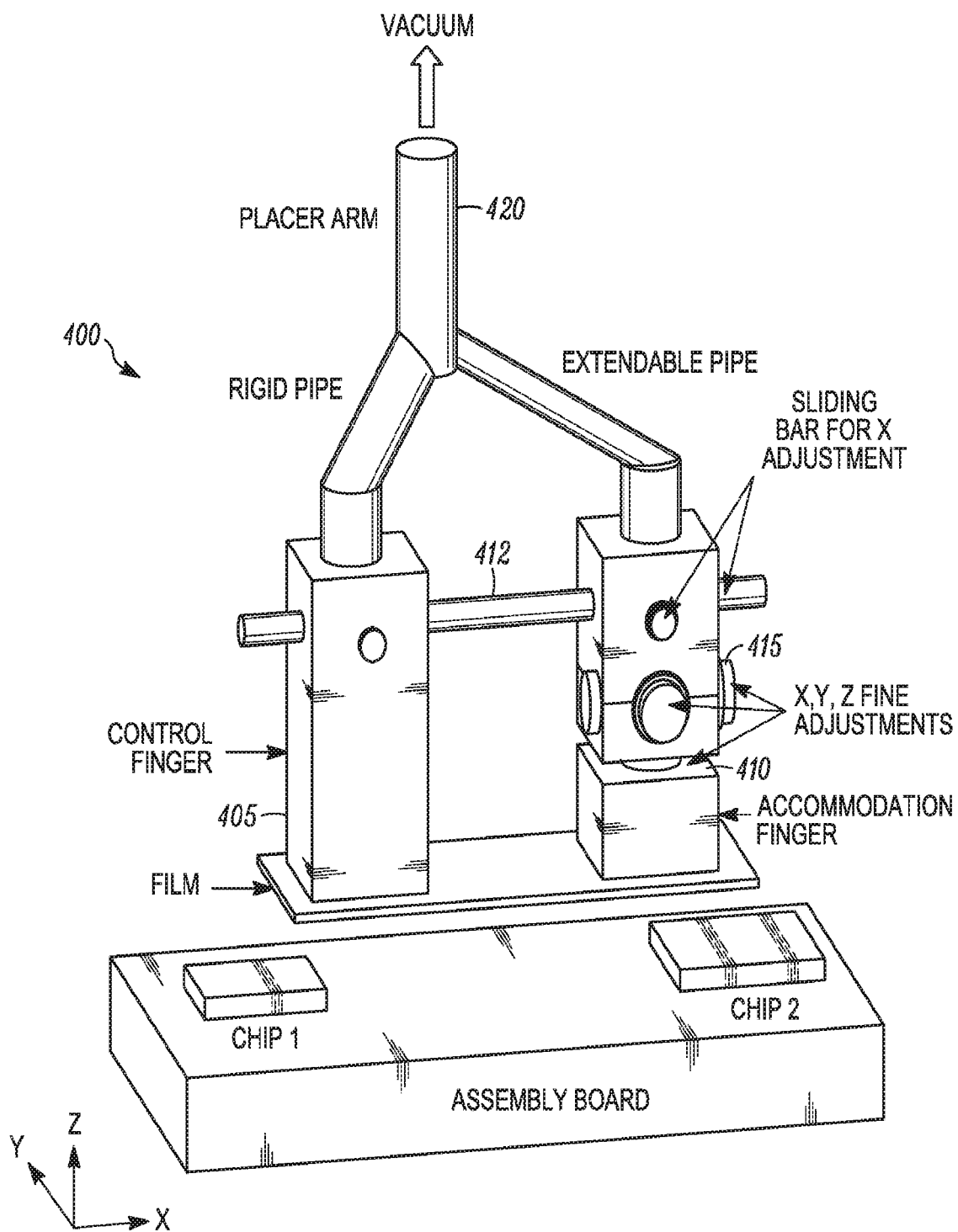

In one embodiment, the dual-finger probe 300 can be connected directly, or via an adapter (not shown), to the placer arm 320. Both fingers, branched out at the distal end of the placer arm 320, may share the same vacuum supply, which connects to the proximal end of the placer arm 320. To enable fine adjustments in relative X, Y and Z positions, an XY position stage may be integrated at the accommodation finger 310, allowing fine displacements in the X and Y-directions. An adapter may be used between the placer arm 320 and the accommodation finger 310, permitting fine adjustments in the Z-direction. The fine-position mechanism can be implemented away from the accommodation finger and the placer arm if space is of concern. Exact dimensions and locations of the fingers, in particular, the separating distance in the X-direction between the two fingers, can be designed according to individual application requirements. This configuration is generally suitable for assembly of two chips with relatively small gaps of e.g., a few millimeters In another embodiment, illustrated in FIG. 14(b), the accommodation finger 410 can be placed on a sliding bar 412 that also connects the control finger 405 such that the separation of the accommodation finger 410 from the control finger 405 in the X-direction can be adjusted continuously along the bar 412, while fine adjustments in the X, Y, and Z-directions are realized locally at the accommodation finger 410 using translation stages 415. This embodiment of the dual-finger probe allows assembly of chips with relatively larger gaps up to, e.g., a couple of centimeters. If the distance between the chips on the stage is greater than, e.g., a few centimeters, two independently controlled position units, each having its own placer arm, probe, and vacuum, etc., may be utilized. In the various embodiments described above, a vision alignment system, involving cameras with zoom optics, and a vacuum supply path for the fingers, may need to be incorporated to have an unobstructed view of the assembly.

In one illustrative operating example using the dual-finger probe described herein, two photonic chips, Chip 1 and Chip 2, both with integrated waveguides, are placed on a single board with designated positions having a gap between the chips of about 500 μm and an offset of 10 μm in reference to the waveguide alignment on the two chips. The difference in thickness of the two chips is about 200 μm, so that the bonding surfaces are not at the same level plane. The board is fixed on the bonding stage by vacuum.

The dual-finger probe is first set with the two fingers aligned at the same Y and Z positions. The separation between the two fingers is chosen to be a slightly larger than the gap of the chips, i.e. >500 μm, but smaller than the film length. Upon picking up the film with both fingers, optical focus is first established between the film and Chip 1. The alignment between features on the film and those on Chip 1 is realized by adjusting the bonding stage. The position of the bonding stage is then fixed while the adjustments are only made locally at the accommodation finger. First, the accommodation finger is moved towards the control finger, about 20-50 μm, so the film has a small deflection in the Z-direction. The focus is then established between Chip 2 and the film by fine adjustment in the Z-direction at the accommodation finger. The offset of the features on the film to those on Chip 2 is examined, and the value is recorded. The desired extra film length needed to accommodate this offset with reduced stress is estimated based on the calculated relationship for this particular assembly. The relationship is similar to that shown in FIG. 11. Fine adjustment at the accommodation finger in the X-direction is then made to provide the desired extra length of film. Subsequently, the accommodation finger is fine tuned in the Y-direction to align the features on the film with those on Chip 2 with zero offset. After all the alignments are established for both chips, the film is brought into contact with both chips simultaneously to realize assembly of the film onto both chips with accommodations of the small offset and the step.

Potting Material and Process

To reduce optical losses due to transitions of the polymer WGs from coupling on chips to air cladding at the gap, an optical potting material may fill the space underneath the polymer WGs in the gap between the two chips and serve as a cladding layer. The material that is chosen needs to possess a suitable refractive index with respect to the waveguide refractive indices in order to improve optical performance. Generally, the index of the material will be lower than the core index of the waveguide. The viscosity and curing method of the material also play roles in obtaining a satisfied potting. In some cases UV curing is preferable to thermal curing because stresses may be introduced during the curing process, particularly at elevated temperatures. To fill a given gap, a potting material with a certain viscosity may be used to help manipulate the underfill by balancing the holding and flowing of the material.

Figure 15A:
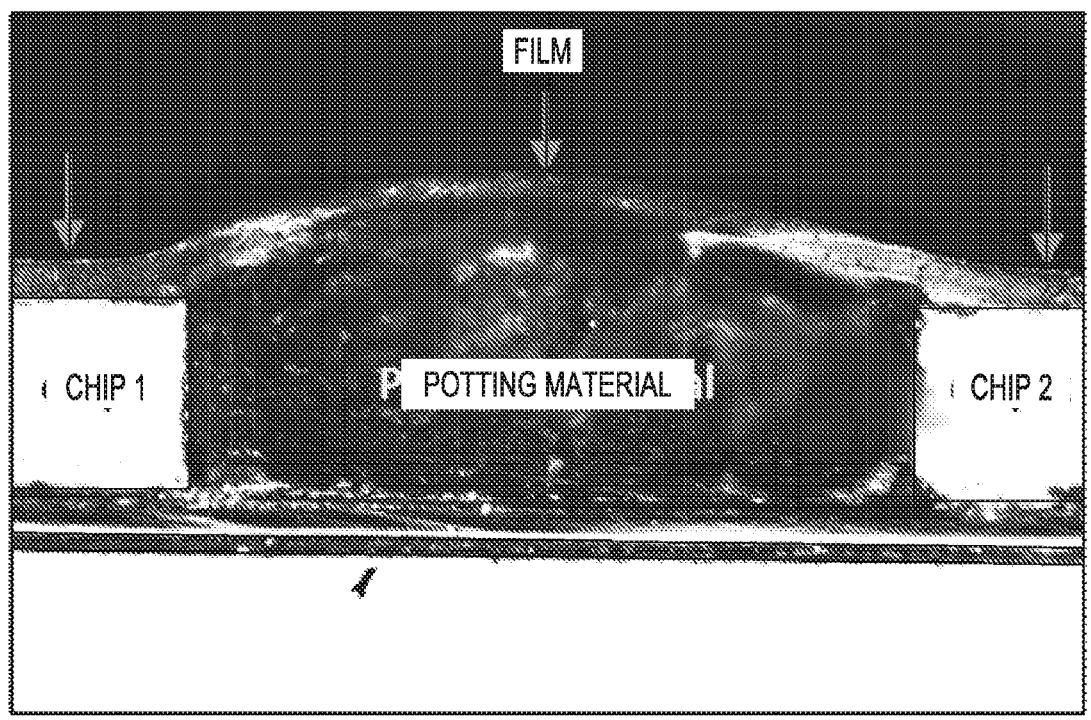
FIGS. 15(a), 15(b) and 15(c) are images showing an interconnect assembly with potting material filling the gap between the chips.
Figure 15C:
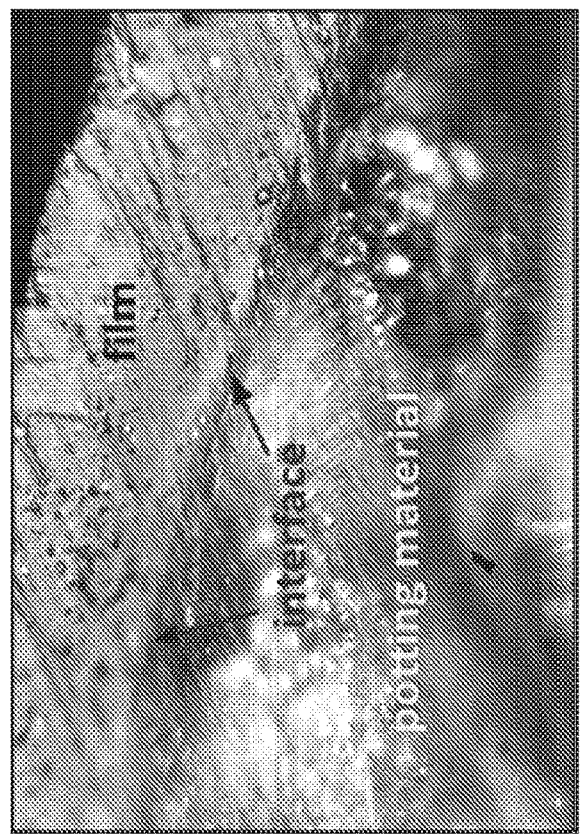
Figure 15B:
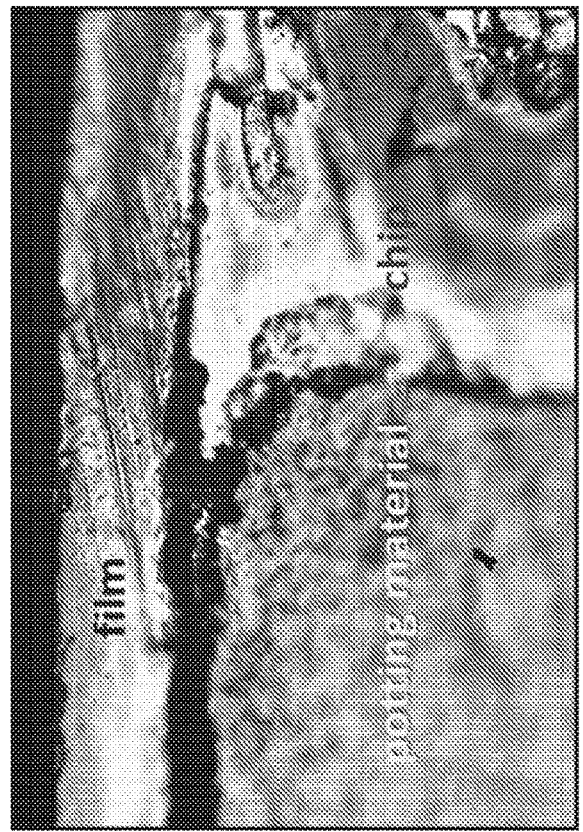

The image in FIG. 15(*a*) shows an assembly of a polymer film with two chips, where the gap beneath the film is filled with potting material. In this example the potting material is NOA1348 (refractive index 1.348, viscosity 1600 cps) and it was applied into the gap using a syringe with a fine needle and cured under UV light in a nitrogen environment. An off-plane deflection is observed at the free edge of the polymer film right above the underfill; however, the film away from the edge remains flat. The deflection at the edge may be caused by dicing using a mechanical die-saw machine.

Close-up views of the interfaces between the film, chip and underfill are shown in the images of FIGS. 15(*b*) and 15(*c*). The potting material fills the gap without voids and establishes a smooth and continuous interface underneath the film, serving as the cladding of the polymer waveguides. Potting materials with a viscosity of about 1000 cps have been found to fill a gap as small as 0.5 mm×0.4 mm in cross-sectional area, while a potting material with higher viscosity (>2000 cps) may be better suited to fill larger gaps above 2 mm×1 mm in cross-sectional area. When a material with a lower viscosity is to be used for larger gaps, the assembly is flipped with the film at the bottom to ensure that the underfill is in full contact with the film. By alternating between applying layers of potting material to the gap followed by UV curing-steps, and repeating the process for subsequent layers, a large gap can be completely filled with a low viscosity potting material. To complete the interconnect packaging, the assembled section can be encapsulated using, for example, silicones or epoxy resins. This can provide not only mechanical support to the assembly but also protection from environmental exposure to things such as dusts, moisture, heat, UV, vibrations, etc.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the embodiments of the invention.

The invention claimed is:

1. A method of forming an optical interconnect between first and second photonic chips located on an optical printed circuit board (OPCB), comprising:
    applying a coupling agent to a bonding surface of a flexible, freestanding polymer waveguide array film having at least one polymer waveguide disposed therein;
    placing the waveguide array film onto the first and second photonic chips so that the waveguide array film extends over a gap and/or a step between the first and second photonic chips to thereby form a bonding interface between the bonding surface of the waveguide array film and the first and second photonic chips, the coupling agent being selected such that optical coupling between the first and second photonic chips arises simultaneously with formation of the bonding interface.

2. The method of claim 1, wherein applying the coupling agent to the bonding surface of the polymer waveguide array film includes forming a coupling agent having a layer thickness less than $\lambda/n$, where $\lambda$ is a wavelength of light to be coupled between the first and second photonic chips and n is an effective refractive index of the polymer waveguide.

3. The method of claim 1, wherein applying the coupling agent to the bonding surface of the polymer waveguide array film includes forming a coupling agent having a layer thickness such that a refractive index of the coupling agent does not substantially impact optical coupling efficiency for wavelengths between 400 nm and 12 microns.

4. The method of claim 1, wherein applying the coupling agent to the bonding surface of the polymer waveguide array film includes forming a coupling agent having a layer thickness less than 50 nm.

5. The method of claim 1, wherein applying the coupling agent to the bonding surface of the polymer waveguide array film includes forming a coupling agent having a layer thickness less than 20 nm.

6. The method of claim 1, wherein the coupling agent is a silane coupling agent.

7. The method of claim 1, wherein the coupling agent is a phosphoric acid compound.

8. The method of claim 1, wherein the coupling agent is selected from a class of coupling agent including organotitanate coupling agents, zirconate coupling agents, zircoaluminate coupling agents and alkyl phosphate esters.

9. The method of claim 1, wherein applying the coupling agent to the bonding surface of the polymer waveguide array film includes applying to the polymer waveguide array film a solution that includes a solvent and the coupling agent.

10. The method of claim 9, wherein the solvent includes water.

11. The method of claim 6, wherein the silane coupling agent includes APTES.

12. The method of claim 6, wherein the silane coupling agent is selected from the group consisting of APTMS, APDMES, AHAMTES and PDMMS.

13. The method of claim 1, further comprising applying an oxygen plasma treatment to the bonding surface prior to applying the coupling agent to the bonding surface of the polymer waveguide array film.

14. The method of claim 1, further comprising applying an oxygen plasma treatment to a surface of the first and second photonic chips prior to placing the waveguide array film onto the first and second photonic chips.

15. The method of claim 1, wherein the first and second photonic chips include at least first and second waveguides, respectively, that are laterally offset with respect to one another, the polymer waveguide being a single mode waveguide that is to optically couple the first and second waveguides, the waveguide array film having a length that is greater than needed to span the gap and/or step such that a flexure portion of the waveguide array film extending over the gap and/or step reduces tensile stress in the waveguide array film while accommodating the offset between the first and second waveguides.

16. The method of claim 15, further comprising selecting the length of the waveguide array film based at least in part on a size of the offset to reduce tensile stress in the waveguide array film.

17. The method of claim 16, further comprising selecting the length of the waveguide array film based at least in part on a size of the offset and the step to reduce tensile stress in the waveguide array film.

18. The method of claim 1, wherein placing the waveguide array film onto the first and second photonic chips further comprises:
aligning a first end portion of the polymer waveguide with the first waveguide on the first photonic chip;
flexing the waveguide array film by moving a second end portion of the waveguide array film toward the first end portion while maintaining alignment between the first end portion of the polymer waveguide and the first waveguide on the first photonic chip;
aligning the second end portion of the polymer waveguide with the second waveguide on the second photonic chip while maintaining alignment between the first end portion of the polymer waveguide and the first waveguide on the first photonic chip;
pressing the waveguide array film onto the first and second photonic chips while maintaining the alignment between the first end portion of the polymer waveguide and the first waveguide on the first photonic chip and the alignment between the second end portion of the polymer waveguide and the second waveguide on the second photonic chip.

19. The method of claim 18, further comprising adjusting a vertical distance between one of a first and second end portions of the waveguide array film and a respective one of the first and second photonic chips with which contact is to be made to accommodate a step height between the first and second photonic chips so that contact between first end portion of the waveguide array film and the first waveguide and between the second end portion of the waveguide array film and the second waveguide occur simultaneously.

20. The method of claim 1, further comprising filling the gap with a potting material after formation of the bonding interface, the potting material having a refractive index lower than refractive indices of a cladding of the polymer waveguide and a cladding of waveguides located on the first and second photonic chips.

21. The method of claim 20, wherein the potting material is a UV or thermally curable material.

22. The method of claim 20, wherein filling the gap includes filling the gap with a viscous potting material that is injected into the gap.

23. The method of claim 22 further comprising injecting the viscous potting material in layer by layer manner and curing each layer before injecting a subsequent layer.

24. A method of forming an optical interconnect between first and second photonic chips located on an optical printed circuit board (OPCB), comprising:
applying a coupling agent to bonding surfaces of both the first and second photonic chips;
placing a flexible, freestanding polymer waveguide array film having at least one polymer waveguide disposed therein onto the bonding surfaces of the first and second photonic chips so that the waveguide array film extends over a gap and/or a step between the first and second photonic chips to thereby form a bonding interface between the waveguide array film and the first and second photonic chips, the coupling agent being selected such that optical coupling between the first and second photonic chips arises simultaneously with formation of the bonding interface.

25. The method of claim 24, wherein applying the coupling agent to the bonding surfaces of the first and second photonic chips includes forming a coupling agent having a layer thickness less than $\lambda/n$, where $\lambda$ is a wavelength of light to be coupled between the first and second photonic chips and n is an effective refractive index of the polymer waveguide.

26. The method of claim 24, wherein applying the coupling agent to the bonding surface of the first and second photonic chips includes forming a coupling agent having a layer thickness such that a refractive index of the coupling agent does not substantially impact optical coupling efficiency for wavelengths between 400 nm and 12 microns.

27. The method of claim 24, wherein applying the coupling agent to the bonding surfaces of the first and second photonic chips includes forming a coupling agent having a layer thickness less than 50 nm.

28. The method of claim 24, wherein applying the coupling agent to the bonding surfaces of the first and second photonic chips includes forming a coupling agent having a layer thickness less than 20 nm.

29. The method of claim 24, wherein the coupling agent is a silane coupling agent.

30. The method of claim 24, wherein the coupling agent is a phosphoric acid compound.

31. The method of claim 24, wherein the coupling agent is selected from a class of coupling agent including organotitanate coupling agents, zirconate coupling agents, zircoaluminate coupling agents and alkyl phosphate esters.

32. The method of claim 1, wherein applying the coupling agent to the bonding surfaces of the first and second photonic chips includes applying to the polymer waveguide array film a solution that includes a solvent and the coupling agent.

33. The method of claim 32, wherein the solvent includes water.

34. The method of claim 29 wherein the silane coupling agent includes APTES.

35. The method of claim 29, wherein the silane coupling agent is selected from the group consisting of APTMS, APDMES, AHAMTES and PDMMS.

36. The method of claim 24, further comprising applying an oxygen plasma treatment to the bonding surfaces prior to applying the coupling agent to the bonding surfaces of the first and second photonic chips.

* * * * *